United States Patent
Yadav-Ranjan et al.

(10) Patent No.: US 12,445,470 B2
(45) Date of Patent: Oct. 14, 2025

(54) IOT BLOCKCHAIN DDOS DETECTION AND COUNTERMEASURES

(71) Applicant: Telefonaktiebolaget LM Ericsson (publ), Stockholm (SE)

(72) Inventors: Rani Yadav-Ranjan, Santa Clara, CA (US); Arthur R. Brisebois, Westport Point, MA (US); Serene Banerjee, Chennai (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 228 days.

(21) Appl. No.: 17/878,592

(22) Filed: Aug. 1, 2022

(65) Prior Publication Data
US 2024/0039938 A1 Feb. 1, 2024

(51) Int. Cl.
G06F 21/00 (2013.01)
H04L 9/40 (2022.01)

(52) U.S. Cl.
CPC ...... H04L 63/1425 (2013.01); H04L 63/1458 (2013.01)

(58) Field of Classification Search
CPC .............. H04L 63/1425; H04L 63/1458
See application file for complete search history.

(56) References Cited

U.S. PATENT DOCUMENTS 9,992,221 B1 * 6/2018 Felstaine ............ H04L 63/1425
10,027,694 B1 * 7/2018 Gupta ................. H04L 63/1458

(Continued)

FOREIGN PATENT DOCUMENTS

KR 20110069217 A * 12/2009

OTHER PUBLICATIONS

Rodrigues, Bruno et al., A Blockchain-Based Architecture for Collaborative DDOS Mitigation with Smart Contracts, HAL open science, 11th IFIP International Conference on Autonomous Infrastructure, Management and Security (AIMS), Jul. 2017, Zurich, Switzerland. pp. 16-29, downloaded from the internet: https://hal.inria.fr/hal-01806063.

(Continued)

*Primary Examiner* — Michael M Lee
(74) *Attorney, Agent, or Firm* — Frost Brown Todd LLP

(57) ABSTRACT

Distributed denial of service (DDoS) attacks launched using internet of things (IoT) devices may be detected and addressed using decentralized computing, potentially in combination with blockchain or other decentralized ledger technology. One method of doing this may include identifying an anomaly by comparing traffic data against baseline traffic data, reporting an anomaly as a potential attack, receiving an indication that the anomaly is an attack, and then performing a set of response measures. The set of response measures may comprise allocating a dedicated frequency channel to traffic associated with the attack and assigning devices associated with the attack to that channel, while assigning other user devices to different frequency channels. Records of the attack and associated devices may be recorded and propagated across nodes, thereby enabling each node to respond appropriately even as the device moves from its original location. Machine learning can be implemented to improve the analysis of key performance indicators to determine which indicators are most predictive of DDoS attacks.

17 Claims, 19 Drawing Sheets

(56) References Cited

U.S. PATENT DOCUMENTS

| | | | |
|---|---|---|---|
| 2019/0182290 A1 | 6/2019 | Haddad | |
| 2019/0380037 A1* | 12/2019 | Lifshitz | H04L 41/0893 |
| 2020/0021994 A1 | 1/2020 | Ranjbar et al. | |
| 2020/0092308 A1* | 3/2020 | Vanguardia | H04L 63/1416 |
| 2020/0204580 A1* | 6/2020 | Konda | H04L 9/50 |
| 2021/0226988 A1* | 7/2021 | Aviv | H04L 63/20 |
| 2023/0336585 A1* | 10/2023 | Koral | H04L 63/1458 |

OTHER PUBLICATIONS

Moudoud, Hajar et al., Prediction and Detection of FDIA and DDoS Attacks in 5G Enabled IoT, IEEE Network, vol. 35, Issue 2, Mar./Apr. 2021.

* cited by examiner

EXAMPLE: RRC CONNECTION REJECT Message

```
DL-CCCH-Message
    rrcConnectionReject
        rrcConnectionReject[0]DL-CCCH-Message =
        message = c1 = rrcConnectionReject =
            criticalExtensions = c1 = rrcConnectionReject-r8 =
                waitTime = 10
```

FIG. 12

IOT BLOCKCHAIN DDOS DETECTION AND COUNTERMEASURES

TECHNICAL FIELD

The present disclosure generally relates to Internet of Things (IoT) and detection of Distributed Denial of Service (DDoS) attacks.

BACKGROUND

Internet of Things (IoT) device density/volume is the new Distributed Denial of Service (DDoS) risk for 5G. The challenge is to convert the risk of high-volume IoT attacks to an opportunity to observe a larger sample of IoT devices and nodes involved in potential attacks. Diversified performance anomalies/time-series based forecasting and anomaly detection, as well as DDoS attack identification utilizing machine learning in circumstances involving hacked IoT devices/insider assaults, would be important for IoT applications (since most IoT devices generate a lower amount of traffic but transmit in more predictable ways than general IP traffic). 5G brings with it a slew of new cybersecurity considerations, including a much higher density of IoT devices. The utilization of cloud and edge computing, as well as the convergence of mobile and traditional IT networks, results in the creation of powerful new attack vectors for the organization.

There currently exist certain challenge(s). By 2026, IoT devices are expected to outnumber mobile phone devices by a factor of nearly 4 to 1. 5G IoT enhancements enable much higher device and traffic density, which should yield acceptable IoT performance under normal operating conditions. Most IoT devices lack a user interface to observe user equipment (UE) behavior, accept software updates and other human-enabled oversight applied to mobile phones. This, plus the sheer number of IoT devices, drives the need for mechanized IoT device management platforms. Such automation enables scale but presents a risk if a single compromised device management platform can rapidly deploy faulty or malicious software to a massive number of IoT devices. Legacy DDoS detection, countermeasure, and mitigation mechanisms, designed for mobile phone networks, will therefore be unable to handle the pace and scale of automated IoT DDoS attacks. The risk of such massive automated IoT DDoS attacks drives the need for intelligent, automated network DDoS detection, countermeasure, and mitigation mechanisms.

SUMMARY

The present disclosure is broadly directed to methods and systems for identifying and responding to DDoS attacks in a communication system, such as an IoT network.

In a first aspect, an embodiment of a method for responding to denial of service attacks comprises: identifying an anomaly by comparing traffic data against baseline traffic data; reporting, based on identifying the anomaly, the anomaly as a potential attack; receiving an indication that the anomaly is an attack; determining that one or more devices are associated with the attack; allocating a dedicated frequency channel to traffic associated with the attack; assigning the one or more devices associated with the attack to the dedicated frequency channel; and assigning all devices not associated with the attack to frequency channels other than the dedicated frequency channel. In a first aspect, an embodiment of a method for responding to denial of service attacks can be characterized in that a network node performs at least one of: identifying, reporting, receiving, determining, allocating, and assigning. In a first aspect, an embodiment of a method for responding to denial of service attacks further comprises updating a record with an identifier for each device from the one or more devices associated with the attack; and reporting the updated record to a base station associated with a plurality of network nodes. In a first aspect, an embodiment of a method for responding to denial of service attacks can be characterized in that reporting comprises reporting the anomaly to a base station, and wherein the indication is sent by the base station and is based on traffic data from a network node; and traffic data from one or more other network nodes, wherein each of the other network nodes is a neighboring node of the network node. In a first aspect, an embodiment of a method for responding to denial of service attacks can be characterized in that the method comprises the base station localizing a device associated with the attack based on timing advance values from three separate network nodes for the device associated with the attack. In a first aspect, an embodiment of a method for responding to denial of service attacks can be characterized in that the timing advance values from three separate network nodes for the device associated with the attack are timing advance values collected at different times as the device associated with the attack moves between network nodes. In a first aspect, an embodiment of a method for responding to denial of service attacks can be characterized in that the timing advance values from three separate network nodes for the device associated with the attack are timing advance values collected after the base station forces the device associated with the attack to switch between network nodes irrespective of movement.

In a second aspect, a method of detecting denial of service attacks comprises measuring one or more key performance indicators related to one or more devices in a communication network; detecting one or more anomalies in the key performance indicators; detecting one or more denial of service attacks in the communication network; correlating data from the one or more denial of service attacks with the one or more anomalies; training a detection module to detect denial of service attacks with the correlated data; and predicting a future denial of service attack based on the training and one or more future anomalies. In a second aspect, the method of detecting denial of service attacks further comprises initiating one or more countermeasures in response to the predicting. In a second aspect, the method of detecting denial of service attacks further comprises identifying one or more devices associated with the denial of service attack based on the one or more future anomalies. In a second aspect, the method of detecting denial of service attacks further comprises recording the one or more devices associated with the attack on a blockchain comprising the one or more devices. In a second aspect, the method of detecting denial of service attacks further comprises; allocating a dedicated frequency channel to traffic associated with the attack; assigning the one or more devices associated with the attack to the dedicated frequency channel; and assigning all devices not associated with the attack to frequency channels other than the dedicated frequency channel. In a second aspect, the method of detecting denial of service attacks can be characterized in that the training comprises at least one of: machine learning, reinforcement learning, actor critic learning, supervised learning, unsupervised learning.

In a third aspect, a method of responding to denial of service attacks comprises: identifying a denial of service attack in a communication network comprising a plurality of devices; identifying one or more devices associated with the attack; recording one or more identifiers of the one or more devices on a distributed ledger comprising the plurality of devices; and performing a countermeasure against the denial of service attack. In a third aspect, the method of responding to denial of service attacks can be characterized in that the one or more identifiers comprise at least one of: device name; device location; IMEI (International Mobile Equipment Identity) number; and SIM (Subscriber Identity Module) number. In a third aspect, the method of responding to denial of service attacks can be characterized in that the identifying a denial of service attack comprises: measuring one or more key performance indicators related to the plurality of devices in a communication network; detecting one or more anomalies in the key performance indicators; detecting one or more denial of service attacks in the communication network; correlating data from the one or more denial of service attacks with the one or more anomalies; training a detection module to detect denial of service attacks with the correlated data; and predicting a future denial of service attack based on the training and one or more future anomalies. In a third aspect, the method of responding to denial of service attacks can be characterized in that performing a countermeasure comprises: identifying an anomaly by comparing traffic data against baseline traffic data; reporting, based on identifying the anomaly, the anomaly as a potential attack; receiving an indication that the anomaly is an attack; determining that the one or more devices are associated with the attack; allocating a dedicated frequency channel to traffic associated with the attack; assigning the one or more devices associated with the attack to the dedicated frequency channel; and assigning all devices not associated with the attack to frequency channels other than the dedicated frequency channel. In a third aspect, the method of responding to denial of service attacks can be characterized in that the distributed leger comprises a blockchain. In a third aspect, the method of responding to denial of service attacks can be characterized in that the distributed ledger comprises one or more smart contracts. In a third aspect, the method of responding to denial of service attacks can be characterized in that the distributed ledger enables interoperability between devices from different manufacturers.

In further aspects, embodiments of a system for responding to or detecting denial of service attacks comprising one or more processors configured with instructions operable to, when executed, perform methods set forth herein are provided.

In still further aspects, embodiments of a computer program product for responding to or detecting denial of service attacks comprising one or more non-transitory machine readable storage mediums having program instructions thereon, which are configured to, when executed by one or more processors, perform methods set forth herein are provided.

Additional benefits and advantages of the disclosed technology will be apparent in view of the following description and accompanying figures.

BRIEF DESCRIPTION OF THE DRAWINGS

Embodiments of the present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following detailed description taken in connection with the appended claims and with reference to the attached drawing figures in which:

FIG. 12 illustrates an example RRC Connection Reject message;

DETAILED DESCRIPTION

As set forth herein, aspects of the disclosed technology may be used in IoT systems to provide detection and countermeasure strategies regarding DDoS attacks. As described herein, existing DDoS detection, countermeasure, and mitigation mechanisms, designed for mobile phone networks, are unable to handle the pace and scale of automated IoT DDoS attacks. The risk of such massive automated IoT DDoS attacks drives the need for intelligent, automated network DDoS detection, countermeasure, and mitigation mechanisms. Certain aspects of the disclosure and their embodiments may provide solutions to these or other challenges. For example, aspects of the technology described herein may address IoT DDoS attack identification and mitigation using a combination of machine learning and block chain technologies applied to various nodes along the IoT network path. In some implementations, machine learning may be used to detect DDOS attacks via noise pattern analysis on the radio interface. Similarly, in some implementations distributed ledger or blockchain recording and smart contracts may be used to detect and report anomalous IoT UE activity and performance patterns from distributed nodes along the IoT network path. Unalterable blockchains (or nearly unalterable) may record "guilty" IoT devices and create a virtually permanent record of corrupted devices. Covert location and countermeasures may be used to classify, isolate and throttle IoT DDOS attacks at the radio interface, thus protecting upstream elements and users without detection or countermeasures by the perpetrator IoT devices.

Certain embodiments may provide one or more of the following technical advantage(s). IoT DDoS classification at the radio interface allows early detection, localization and countermeasures close to the attack source, thus protecting upstream nodes and users. Blockchain recording and smart contracts provide a more efficient means to track, detect and report anomalous IoT UE behavior in upstream nodes, compared to probing, packet inspection, centralized storage and data mining techniques. Covert radio DDoS countermeasure effectiveness increases with the number of DDoS UEs, and the interference and blocking they cause for each other at the leading edge of their attempted transactions.

Some of the embodiments contemplated herein will now be described more fully with reference to the accompanying drawings. Embodiments are provided by way of example to convey the scope of the subject matter to those skilled in the art.

Figure 1:
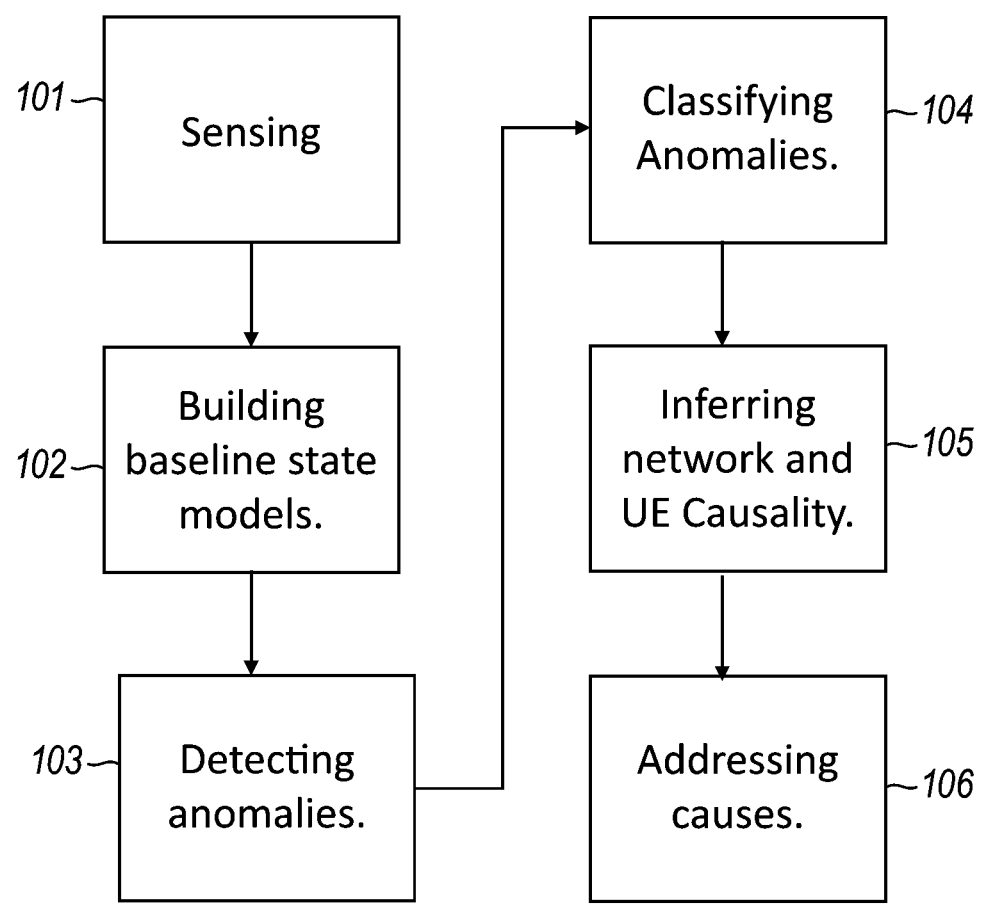
FIG. 1 depicts a high-level view of a flow chart of a method embodiment under the present disclosure.

To provide scale and automation for detecting and addressing DDoS attacks given high IoT device density, some implementations of the disclosed technology may utilize a step by step approach. As shown in FIG. 1, this may include, in block 101, sensing, which may identify which measurement points and metrics can reveal a potential DDoS attack. For example, as described below in the context of FIG. 2, metrics such as interference, and average signal to interference and noise ratio (SINR) may be used for identifying a DDoS attack. However, other types of metrics may also, or alternatively be used. For example, information from UE trace and/or billing records, radio evolved node base station (eNB)/5G node base station (gNB) traffic records, and/or mobility management entity (MIME)/access and mobility management function (AMF) for control plane sensing, and packet gateway (PGW)/user plane function (UPF) for user plane sensing may be used in various embodiments.

In a step by step approach such as shown in FIG. 1, once appropriate measurement points have been identified, they may be used in block 102 for building baseline state models. Such models may represent "normal" or non-anomalous UE and network states, observable by sensing, that exist before a DDoS incident. Examples include UE volume/attach/tracking area update per hour, radio uplink noise, Random Access Control Channel (RACCH) occupancy, MME/AMF attach/tracking area update per attached UE/hour, and PGW/UPF data volume per connected UE. With the measurement points identified and the baseline state models built, the approach of FIG. 1 continues in block 103 with detecting network and UE anomalies. This may include detecting abnormal conditions, which may or may not be DDoS attacks, using UE and network sensing data which is out of alignment with baselines. Anomaly examples include uplink noise, signaling, and/or user data traffic volume spikes compared to baseline.

As shown in FIG. 1, once detected, anomalies may be classified in block 104. This may include, for example, determining if an anomaly should or should not be treated as an attack by comparing (e.g., at a base station) traffic information from a cell site which initially reported an anomaly (primary site) as well as neighboring sites. This classification may be performed to narrow relatively broad, and compute expensive, causality inference actions to a manageable set. Sensed data patterns are temporal, spatial and distribution clues that suggest an optimal path for causality inference. From the network perspective, sensing data may be compared at multiple nodes (including virtual functions and their host locations) in order to determine if anomaly trends occur at the same time, with perhaps different intensities. If yes, then common spatial and morphology factors, for example overlapping or adjacent coverage areas and host locations, may be identified. If no, then node-specific indications, including metrics and alarms, may be observed for temporal correlation to the anomaly condition. Such observations may lead to a distributed or local network anomaly classification. From the UE/subscriber perspective, sensing data may be analyzed to determine if network-observed anomalies correlate with signaling spikes for a single UE or multiple UE with something in common. Such observations may lead to a distributed or unique anomaly classification or some sort of distribution factor shades between "black" and "white".

After anomalies have been classified in block 104, the approach illustrated in FIG. 1 continues with inferring Network and UE Causality in block 105. In this block, the combination of network and UE anomaly classification may be used to initiate/instantiate a targeted causality inference path. For example, the source of a DDoS attack may be localized by considering timing advance information such as described below in the context of FIG. 4. Other types of causality inference are also possible. For example, if network and UE anomaly classifications are distributed, then network and UE sensing data may be observed for temporal relationships to determine if a large number of UE affected a large number of network nodes (DDoS) or a large number of network nodes affected a large number of UE (network failure). If network anomaly classification is local and UE anomaly classification is distributed, then an inverse correlation study of UE sensing data can determine what is different, for example, between virtual RAN and core network functions and hosting locations, or between UE with and without anomalous behavior in the same RAN area. If network anomaly classification is distributed, and UE anomaly classification is relatively unique, then UE sensing data may be observed for coincident behavioral patterns of multiple UE. For example:

Do all anomalous UE exhibit signaling spikes at the same time on different virtual core nodes connected to the same RAN?

What happens to the signaling volume of non-anomalous UE on the same RAN nodes as anomalous UE?

What is the difference between the anomalous and non-anomalous UE (subscription/slice, IMEI range indicating hardware)?

What is common between the anomalous UE? For example, do they all change cells at the same time, indicating the presence in a common vehicle, etc. . . . .

Layers of anomaly classifications and causal inference may lead to targeted UE or network remedy actions.

As shown in FIG. 1, a step by step approach may include addressing UE and network DDoS causes via countermeasures and/or other remedial actions in block 106. If coordinated/coincident UE signaling actions are observed, then appropriate countermeasures may be instantiated to steer these UE down a network path which limits their impact on the upstream network and legitimate UE. In this case, a desirable outcome may be for the anomalous UE to impact or deny service to each other, thus using the high density of DDoS IoT devices as an enabler, versus challenge, to a powerful DDoS defense mechanism. Next, additional spatial classification, using geolocation techniques, may be used to identify the presence or absence of DDoS device clusters. Additional remedial actions, including automated over-the-air software updates, may be used to further identify, repair, impair or completely disable DDoS devices. Finally, proactive actions must be taken to prevent DDoS UE from impacting additional networks after detection. These countermeasures and remedial actions may be designed to mimic normal or DDoS-impaired conditions that are difficult for IoT devices to detect or counter.

Aspects of the disclosed technology may be used to address DDoS attack identification and mitigation using a combination of machine learning and blockchain technologies. In this description, blockchain should be understood as referring to technology that records and maintains transactions in a verifiable and permanent manner using decentralized ledgers that can be updated from multiple nodes along a network transaction path (e.g., by multiple cell sites, multiple user and control plane nodes, in a network). Similarly, a smart contract should be understood as a computer program that is executed in a secure environment that directly monitors and controls digital assets. A smart contract can be configured with rules that update records when specified conditions are met at nodes along a network transaction path. When applied to the IoT DDoS use case, blockchain records and smart-contract-initiated updates can be used to track device behavior and network impacts, and therefore provide an efficient data source for DDoS anomaly detection, countermeasure and mitigation functions. Compared to traditional probing, packet inspection, and data caching techniques, this blockchain approach is better suited for the privacy, scale, and speed of IoT networks. If a particular IoT device is identified as a source of a DDoS attack, then that device name, location or other identifier can be stored on the blockchain, creating a permanent (or nearly permanent, depending on the blockchain technology used) record. All devices on the blockchain may then know which device(s) can be the target of countermeasures.

Machine learning can be used at multiple points in the process shown in FIG. 1. At each step in the process, machine learning can provide a means to determine which approach taken for each step 101-106 is most successful at detecting DDoS attacks or in addressing the causes. Machine learning is a type of artificial intelligence (AI) by which software applications can become better at predicting outcomes, even if the software is not explicitly programmed to do so. Machine learning algorithms often utilize historical data as an input to predict new output values. Machine learning approaches can take several forms, including supervised learning, reinforcement learning, self-supervised learning, unsupervised learning, actor-critic, and more. Reinforcement learning is a type of machine learning that utilizes the rewarding of desired behavior and punishing undesired behaviors. A reinforcement learning module or agent can typically interact with its environment and take actions and learn through a process of trial and error.

Figure 2:
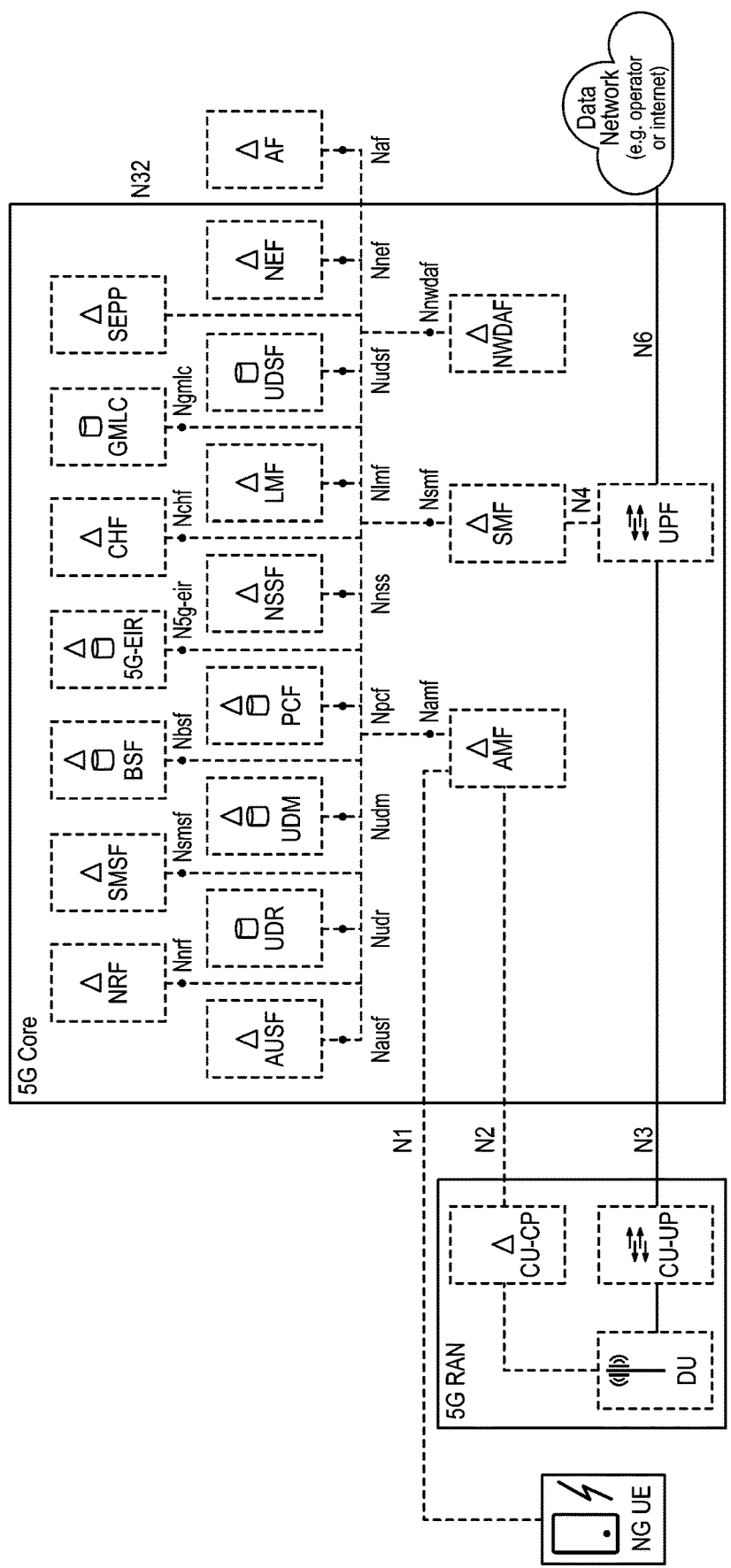
FIG. 2 illustrates an example 5G architecture.

FIG. 2 illustrates an example 5G architecture. Within 3GPP standards, there is a clear functional separation between RAN and 5G core specified as the N1, N2 and N3 reference points. N1 uses N2 to transport its traffic within the network. N2 and N3 in FIG. 2 show the reference points within the network according to the functional architecture. In existing mobile networks, such as 3G and 4G, RAN and core have been deployed on geographically different sites. RAN has typically been deployed on several distributed sites to achieve optimized coverage and performance, whereas the core networks are deployed on a few regional and nationwide sites, supporting, in the process, many RAN sites. This conventional practice of deploying 3G and 4G networks is the reason why the separation of RAN and core is commonly presumed also for 5G. However, 5G and recent advances in implementation technology offer the possibility of flexible deployments, such as those with single sites, edge computing, cloud, and containers. These implementation and deployment choices are not defined by 3GPP standard. Rather, the degree of separation between RAN and core is established by commercial decisions. Consequently, service providers that seek to be commercially relevant for end users demanding low-latency services will not be limited by 3GPP standards. Instead, they will have the commercial incentives to deploy 5G networks in such a manner as to require only a very limited separation of RAN and core to achieve certain capabilities unique to 5G, such as low latency.

When discussing the separation of RAN and core in 5G, broader technological evolutions should also be considered that have implications beyond 5G standards. In the case of 5G, the deployment of most network functions will be virtualized and cloud-based, allowing them to be deployed in different ways, depending on the use case. The mobile broadband use case, for example, may still rely on centralized core, but in cases related to IoT and manufacturing, a core network (or at least the user-plane function) closer to or co-located with RAN may be needed to support the low latency and high throughput required. In addition to the co-location of RAN and core on a single site, edge computing also allows for the possibility of deploying other vital network applications on the same physical site, which further blurs the distinction between RAN, core, and IT cloud. For example, each of the nodes shown in FIG. 2 may comprise blockchain and/or smart contract capabilities. These nodes may comprise the ability to observe and record anomalies that may be classified as DDoS.

During a DDoS attack, traffic is jammed by replicating ghost addresses. So, it is possible to identify anomalies in traffic patterns as time series and help identify an attack when it happens. The disclosed technology may be implemented using (a) an ensemble-based approach, and (b) an online approach for detecting anomalies in time series. In some cases, this may use self-supervised learning, where, depending on the conditions that led to an attack (anomaly), it may be possible to use historical patterns to predict an anomaly before it happens. In some cases this may be used to enable alerting at the onset of an attack before legitimate network communication from unaffected UEs is impacted.

Figure 3:
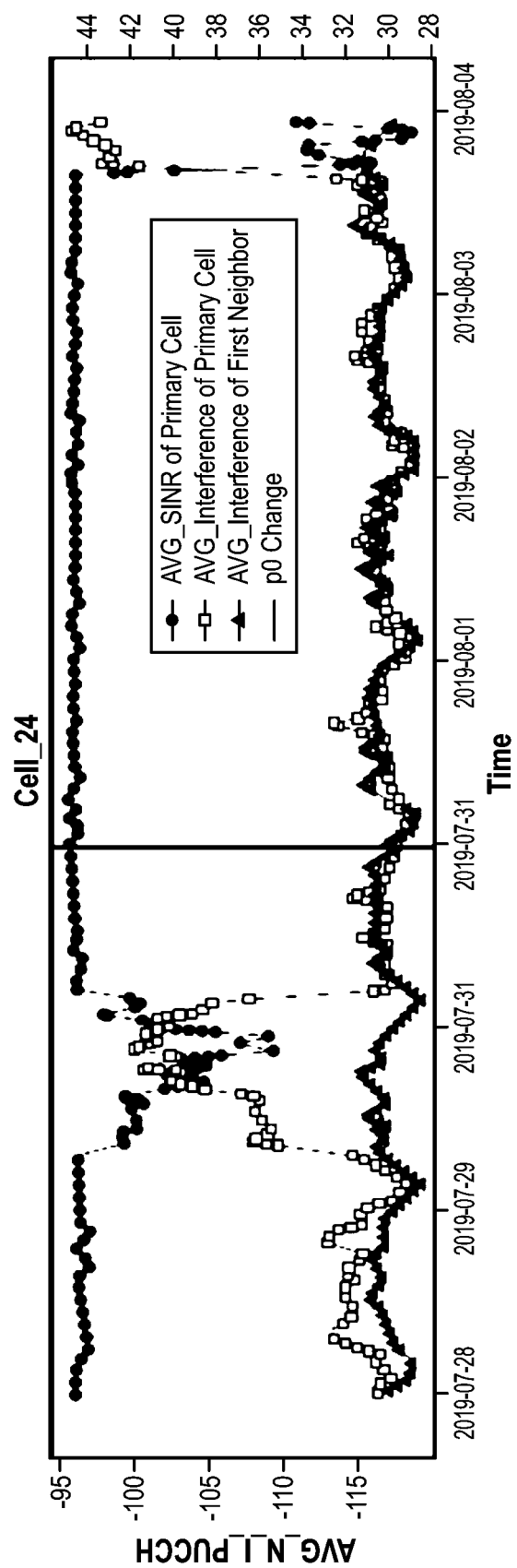
FIG. 3 illustrates frequency interference among nodes in a communication network possibly indicative of a DDoS attack.

DDoS attacks may lead to a rise in uplink noise in the attacked cell, but not in the neighbors. If the noise is from usual traffic, the neighbor cells are also likely to experience a similar rise in uplink noise. In the case of a DDoS attack, the noise rise is local to that cell under consideration only, with minimal environmental impact. This is depicted in FIG. 3, which illustrates average interference of the primary cell, the average signal to interference and noise ratio (SINR) of the primary cell, and the average interference of the first neighbor. It can be seen that the rise in uplink noise of the primary cell follows a pattern very similar to that of its neighbors and can be seen for most of the days—this is clearly due to traffic. On the second day, the rise in noise exceeds that of the neighbors and there is little or no environmental impact. From this, it is possible to observe that:

Uplink noise is low and similar to neighbor cells most of the time;

There are traffic-dependent spikes in uplink noise that are higher than neighbor cells; and Uplink SINR drops do not correlate with uplink noise rise at neighbor cells, i.e. it is local traffic-dependent noise with no environmental impact;

Some connected UE exhibit signaling and/or user data volume patterns that correlate with the uplink SINR patterns of the attacked cell. These UE may be classified as DDoS perpetrators.

Accordingly, as shown in FIG. 3, is possible to conclude that uncorrelated noise is from DDoS. As discussed below, in some cases time series-based methods may be used to detect this type of anomaly.

In some implementations, an ensemble of time series-based machine learning and signal processing approaches may be used (e.g., by a base station) to automatically identify DDoS attacks in real time. Such approaches may analyze key performance indicators (KPIs) of a primary cell and its nearest neighbors. This type of ensemble approach may be validated for various environmental conditions using data from LTE and 5G consumer networks, and may use a combination of:

Time series distance-based measures, such as Dynamic Time Warping (DTW);

Frequency domain-based measures or generalized (uniform or non-uniform) filter-bank based approaches, such as Wavelets and Short Time Fourier Transform (STFT); and Sequence model-based measures, such as Hidden Markov Models (HMM).

Figure 4:
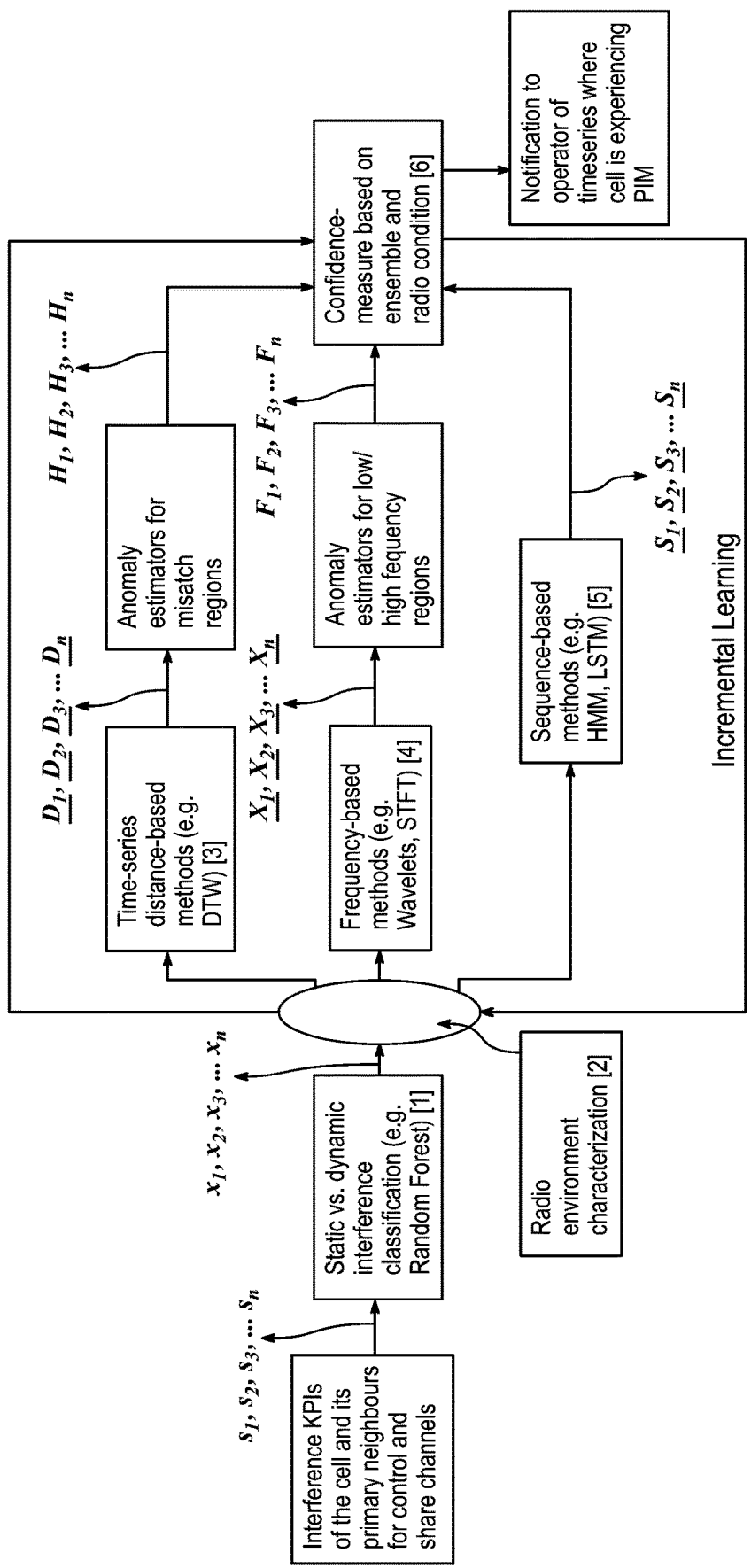
FIG. 4 illustrates a process flow diagram of a method embodiment under the present disclosure.

A block diagram illustrating how this type of approach may be implemented is provided in FIG. 4.

The described approach may also be extended to multi-frequency time series, by using Fourier Feature Mapping to handle finer time granularities and detect DDoS anomalies in an online learning setting. Additionally, in some cases a self-supervised reinforcement learning approach to identify DDoS related anomalies at the outset before they impact system resources. In such an approach, environmental conditions that give rise to denials of service may be forecast based on offline historical data and this may be used to generate a model to predict future occurrences. Experimental results on real-word datasets comprising of 50,000+ cells have shown to accurately identify DDoS attacks prior to their impacting operation 60% of the time.

Figure 5:
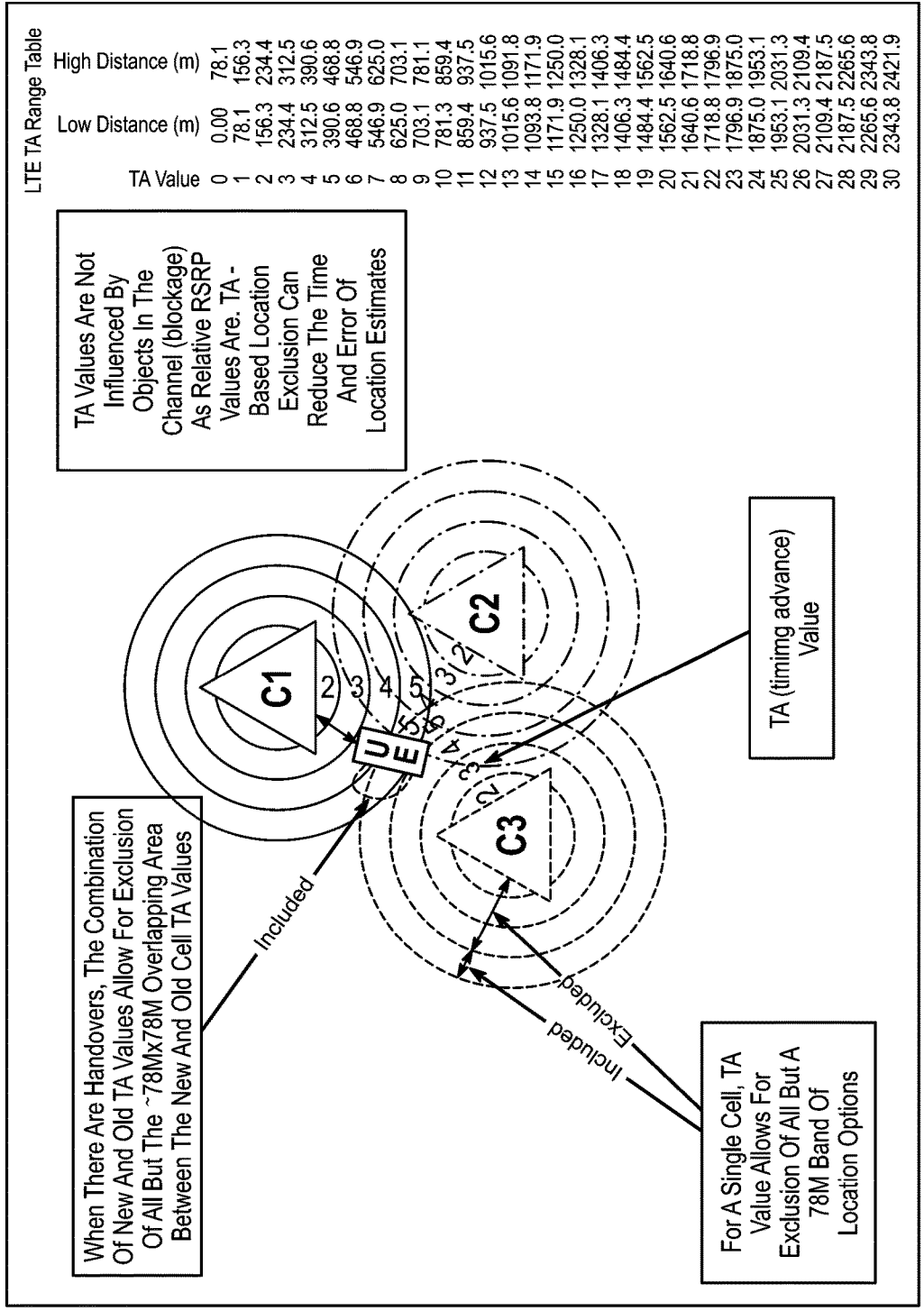
FIG. 5 illustrates the use of timing advance values for location fingerprinting in an embodiment under the present disclosure.

In some implementations of the disclosed technology, mitigation and remediation procedures may be targeted at specific locations and cell sites. This type of targeted strategy may be supported by location fingerprinting of DDoS UE, and the possibility of "swarms" of DDoS UE. An example of this type of localization is to use timing advance (TA) information for DDoS location fingerprinting, as illustrated in FIG. 5. While active, all cellular UEs adjust their uplink transmit burst timing to align with the frame structure of the serving cell site receiver. As each UE moves further away, uplink transmit bursts take longer to reach the cell site. When the reception is delayed beyond a threshold, the cell site commands the UE to increase the timing advance value, thus sending uplink bursts sooner to overcome the additional delay. Each timing advance increment represents a 78 m distance between the UE and cell site. When classified as DDoS, the timing advance value can be used to geolocate the perpetrator UE within a 78 m band around the known cell site location. When there are handovers between two cell sites of known location, the old (before handover) and new (after handover) timing advance values can be used to narrow the location estimate even further. If there are handovers between three or more cells in a constellation, as per cells 1, 2, and 3 in FIG. 5, the location estimate can be reduced to a 78 m diameter circle. If multiple DDoS perpetrator UEs affect the same cell site at the same time, they may be clustered together in a van or building that can be investigated by law enforcement. In this case, a time series of cell site and timing advance changes can be observed and compared for each suspect DDoS perpetrator UE. If cell site and timing advance changes for multiple DDoS perpetrator UEs coincide, then these perpetrator UEs are likely in the same moving vehicle or building. If suspect DDoS perpetrator UEs are stationary for a considerable time, then the radio network can force handovers while observing timing advance values between neighboring cells in a constellation such as C1, C2, and C3 in FIG. 5. This technique can also be enhanced by the angle of arrival data where beam forming radios are deployed. If all perpetrator UEs align with the same 78 m diameter circle, they, and their operator, are likely in the same location.

Figure 6:
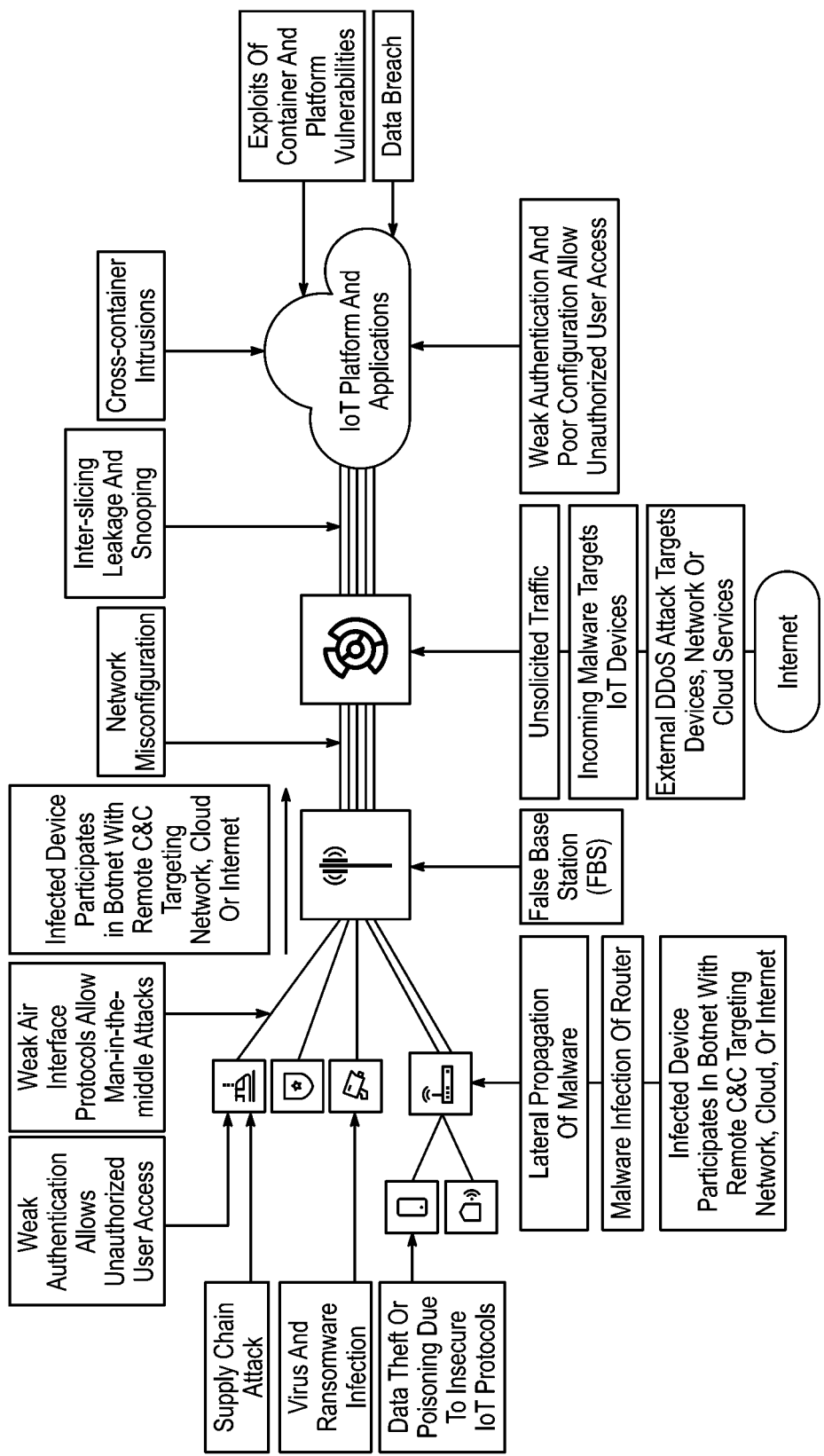
FIG. 6 illustrates a high-level view of an IoT network and possible failure points.

With a DDoS attack identified, and the UEs perpetrating the DDoS attack identified, the impact of the DDoS attack may be minimized or eliminated. As shown in FIG. 6, DDoS attacks may target one or many networks, platforms, applications and/or service victims. Given the variety and number of IoT devices and potential DDoS victims, it may not be practical to apply countermeasures or mitigations at all end-points and intermediate nodes, and some types of intermediate node mitigation techniques may even exacerbate DDoS impact for other nodes in a network. For example, packet core nodes may selectively drop packets for DDoS perpetrator flows, thus rate-limiting the DDoS impact to upstream nodes in the core, internet, and IoT platforms. However, this kind of overt countermeasure action may trigger an even more damaging reaction, packet retransmission, from the perpetrator UEs. Packet retransmission will amplify the radio noise and congestion that triggered DDoS countermeasures and mitigation in the first place. Another intermediate node DDoS mitigation technique, called "defense by offense", deliberately increases the volume of "good client" traffic so there is less bandwidth for the DDoS perpetrators to use. This method may slow down the DDoS devices, but it will also amplify radio noise and congestion that triggered DDoS mitigation in the first place. Traditional radio congestion mitigation techniques, such as RRC connection reject, may also amplify DDoS radio degradation. In the RRC connection reject case, the victim cell sends RRC connection reject, along with a wait timer ranging from 0 to 16 seconds, to the DDoS perpetrator UEs. This kind of overt countermeasure action may cause the compromised perpetrator UEs to ignore wait times and instead send noise-inducing RRC requests at an even faster rate. Considering these examples, IoT device density, and the sheer volume of DDoS attacks they could bring, the disclosed technology may provide a more targeted yet less overt countermeasure and mitigation approach.

Figure 7:
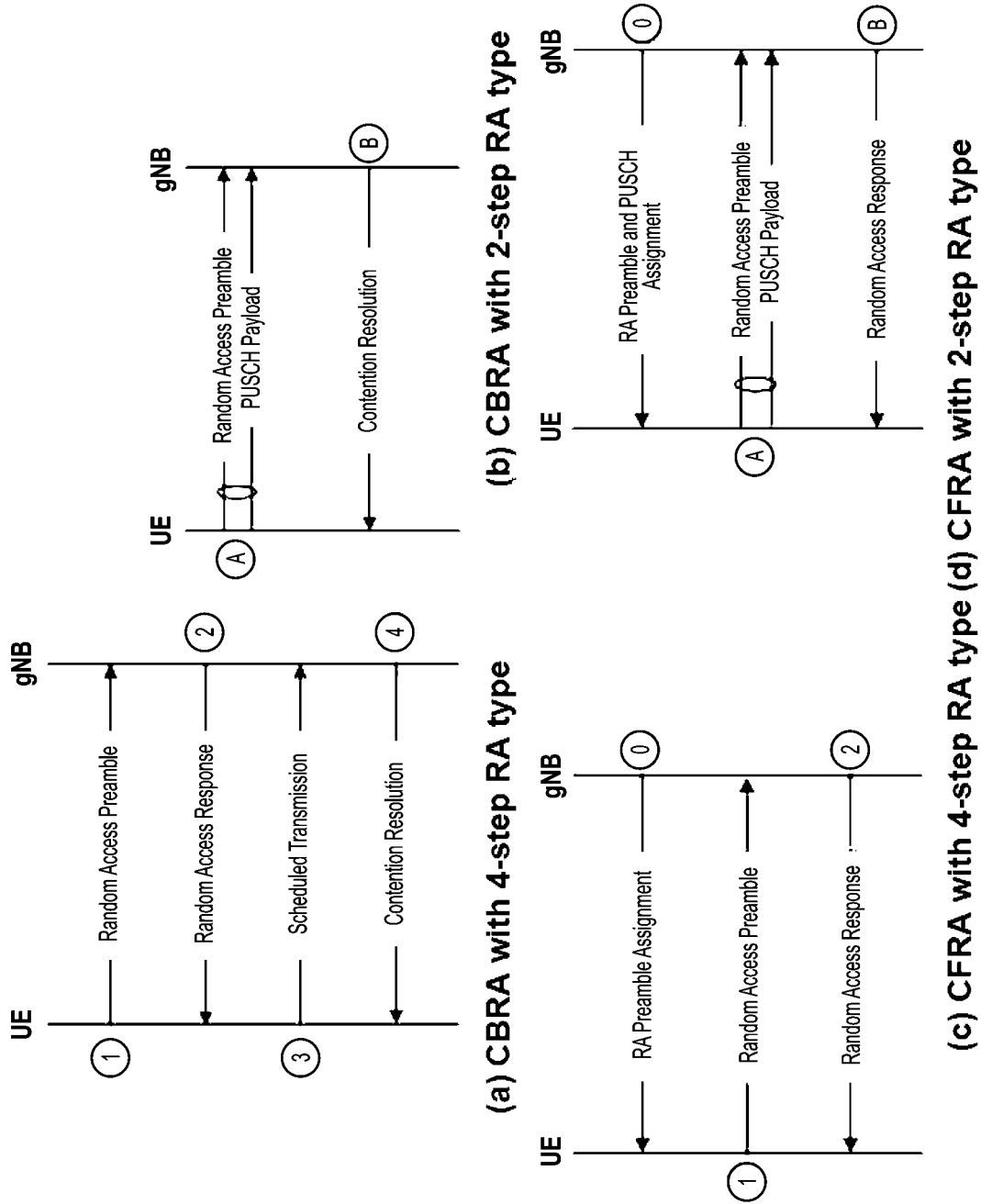
FIG. 7 illustrates possible CBRA and CFRA embodiments under the present disclosure.

As an example of a potential covert DDoS countermeasure, in some cases DDoS devices may be quarantined so that their impact on legitimate traffic is minimized. According to 3GPP 38.300 standards, all UE, including IoT, must initially access the radio network via a Random Access Control Channel (RACCH). For each UE, this shared RACCH is the initial path to dedicated resources used for the remainder of any transaction. As shown in FIG. 7, while sharing a common primary cell (radio carrier), UEs must share and therefore compete for RACCH resources in a contention-based or contention free manner. In contention-based RACCH, over-active DDoS UEs may jam the RACCH with interference in the form of RACCH collisions with other UEs attempting to access the same cell at the same time. In contention-free RACCH, over-active DDoS UEs may occupy a disproportionate share of RA preamble assignments. In either case, legitimate UEs, sharing the same RACCH with DDoS UEs, will suffer delayed or blocked access to the radio network.

Figure 8:
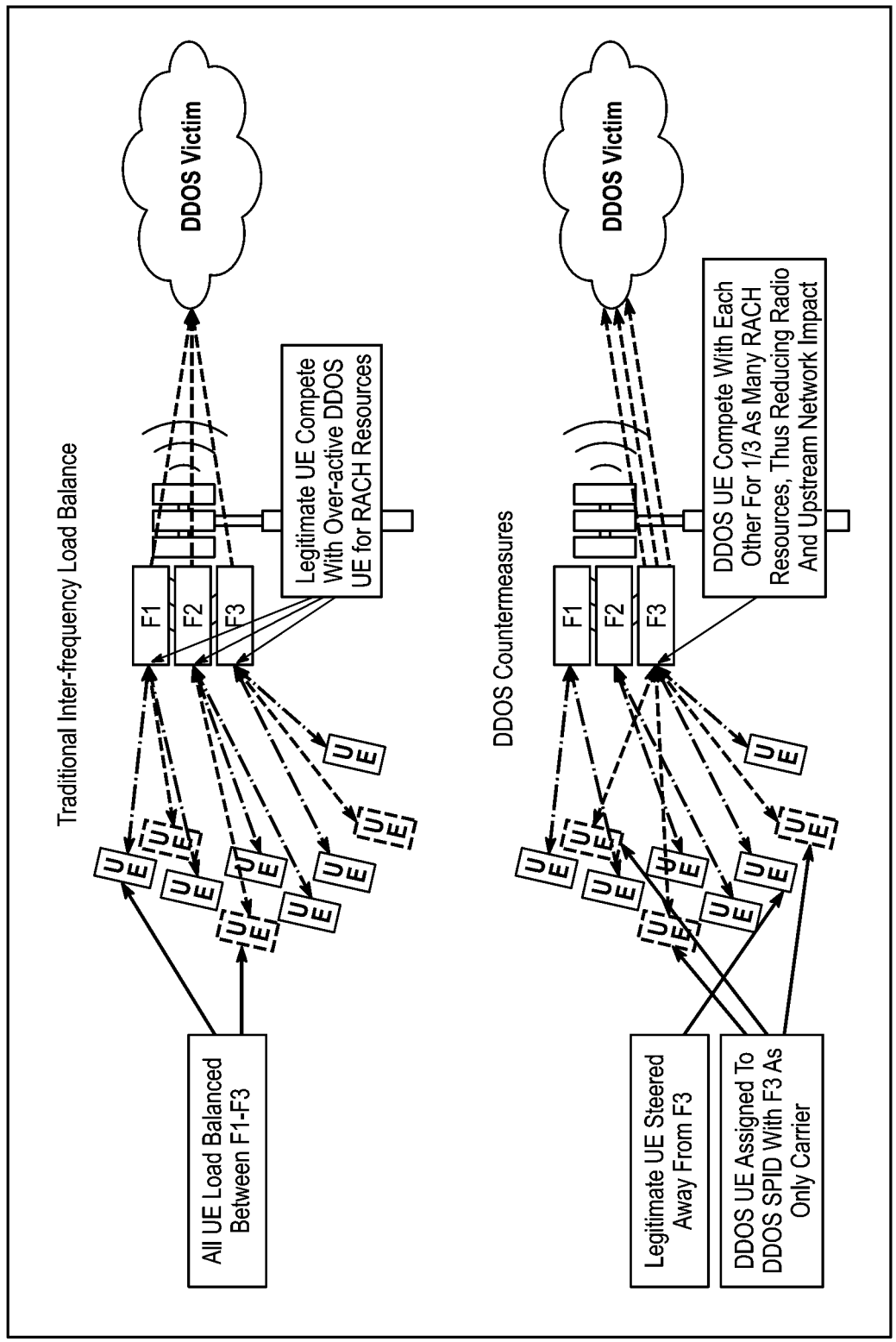
FIG. 8 illustrates possible frequency truncating countermeasures under the present disclosure.

Under typical load conditions, all UEs are load balanced between available frequencies and RACCH resources. This is accomplished with inter-frequency handovers at the leading edge of transactions, and/or release with cell info at the trailing edge of transactions. Such load balancing behavior is optimal under normal conditions, but with DDoS, this approach multiplies the legitimate UE impact and radio RACCH signaling capacity between DDoS UEs and upstream targets. Accordingly, in a system implemented based on this disclosure, when a DDoS is detected, an impacted cell site applies a defensive load balance mechanism which pushes DDOS UEs towards a single, narrow radio frequency that is not shared with legitimate UE. This is accomplished via assignment of a DDoS countermeasure SPID (Service Profile Identifier), which narrows DDoS UE access to a single selected radio frequency. Such frequency narrowing may be accompanied by a narrowing of memory and other processing resources which may be used to process DDoS UE communications, for example, in a case where digital signal processors are provisioned based on spectrum, thereby preventing the processing from overloading either the physical or network resources of the system. In cases, such as private networks, where available spectrum is initially applied to a single radio frequency (absolute radio-frequency channel number (ARFCN) or evolved-UTRA absolute radio frequency channel number (EARFCN)), the cell site may subdivide the spectrum by creating two new frequencies with imbalanced bandwidth. Over-active DDoS UEs compete and collide with each other for fewer RACCH resources on a single, narrow radio frequency, and are less likely to acquire dedicated resources towards the upstream network, platform, application, and service nodes. From the DDoS UE perspective, this observeable load balance and congestion activity appears to be the intended outcome from the DDoS attack=DDoS mission accomplished. From the legitimate UE and network perspective, the DDoS UEs are fighting and blocking each other before they are able to reach the DDoS victim=DDoS mission thwarted. As shown in FIG. 8, this may improve upon traditional inter-frequency load balancing by ensuring that DDoS UEs are competing with each other and not with UEs which may have a legitimate need for network resources.

In some implementations of the disclosed technology, edge computing can be used to (a) detect network anomalies, (b) detect UE locations using timing advance, and or (c) for DDoS countermeasures. As a countermeasure, a node-to-node communication architecture based on edge computing for 5G networks may provide low latency. In order to establish the connection, a next generation evolved node base station (gNB) associated with the connection may import the essential information from surrounding edge servers (e.g., data regarding previously detected DDoS incidents). Data analytic units (DAUs) may then be used to analyze the data that has been retrieved. DAUs may be implemented as built-in processing units that collaborate closely with edge servers and gNBs. Edge servers and data analytic units are frequently deployed across the coverage zone. They may provide and receive services from gNBs to establish node-to-node communication. In order to accomplish node-to-node communication between nodes, a robust mobility management mechanism for dynamic mobile users may also be provided.

Just as decentralized edge computing may be used to detect and react to anomalies, in some implementations decentralized records, such as a blockchain ledger, may be used to maintain information regarding DDoS attacks. For example, after an anomaly is identified as a DDoS attack, then, in addition to responding with mitigation measures (e.g., directing traffic from DDoS UEs to a restricted frequency), a cell site may update a record with information on the DDoS UEs, such as their MAC addresses and/or device fingerprints. This record may then be propagated to other cell sites by communicating it to the primary cell site's base station and the base station distributing it to the remaining sites. In this way, if a DDoS UE were to migrate from one site to another, then the subsequent sites may simply refer to their records (e.g., by locally executing a smart contract) to determine that that UE should be treated as a DDoS UE, rather than having to identify and analyze an anomaly as described previously. Similarly, edge processing and decentralized records may be used for other functionality, such as generating reports when logjams such as may be triggered by DDoS attacks occur, and/or storing information regarding attacks beyond the devices involved in the attacks, such as the time the attack was initiated and the location from which it was initiated. This may be used subsequently for addition mitigation or response measures, such as alerting law enforcement of a particular location (e.g., a building) or instrumentality (e.g., a van, in the event that a swarm of DDoS UEs were detected in motion) associated with a DDoS attack.

Referring to FIG. 8 and FIG. 2, the functionalities in each figure can be implemented in the embodiments shown in the other figure. For example, the mitigation technique shown in FIG. 8 can be implemented by the nodes shown in the possible 5G implementation shown in FIG. 2. In addition, smart contracts, records, and record propagation are not limited to radio cell sites. These blockchain functions can also include core nodes (user and control plane), as shown in FIG. 2.

Figure 9:
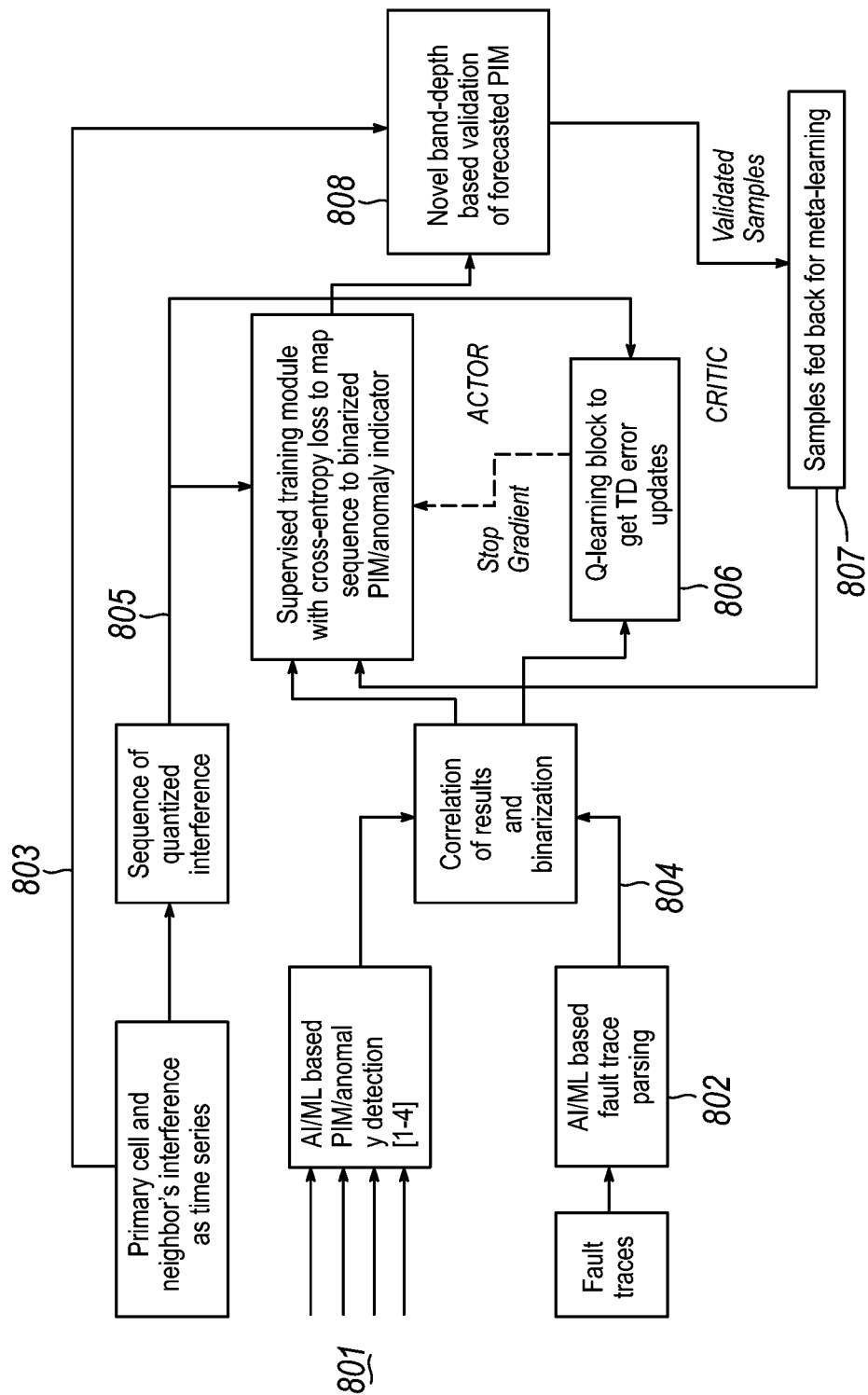
FIG. 9 illustrates a possible actor-critic machine learning embodiment under the present disclosure.

As described above, machine learning can be utilized in the present disclosure to improve the detection of DDoS attacks. One example, FIG. 9 illustrates a block diagram of a self-supervised anomaly detection from uplink noise rise. As discussed above, rise in uplink noise is one sign of a possible DDoS attack. At step 801, PIM (passive intermodulation) or other anomalies are detected, such as by AI or ML-based techniques. Fault trace parsing is performed at 802, and at 804 the anomaly detection and fault trace parsing are correlated and binarized. At 803, cell interference as a time series is used to create a sequence of quantized interference which is then shared to the training module (actor) at 805 and the Q-learning block (critic) at 806. The interference time series is also shared to, at 808, validate forecasted PIM. Validated samples are, at 807, used to create samples that are fed to the actor at 805 for meta-learning. The correlated results from 804 and the sequence of quantized interference are combined in the critic at 806 to create TD (temporal distance) error updates. The correlated results and binarization of 804, sequence of quantized interference from 803, and a stop gradient from the critic at 806 are used by the actor at 805. At 805 the actor uses a supervised training module with cross-entropy loss to map the sequence to binarized PIM/anomaly indicators. The output of step 805 is shared to the validation step at 808, where the output can be compared to the measure interference time series to create the validated samples that are fed back, at 807, to the actor at 805 for use in improving the training module. Further possible embodiments of aspects of FIG. 9 are given below.

The next occurrence of an anomaly can be formulated as a Markov Decision Process (MDP), where state, action, and rewards are as described below:

State: In this case, the state is the quantized values of sequential interference that the cell is experiencing. Higher interference could lead to call drop, service degradation, etc.

Action: Actions are quantized interference values that led to a positive affirmation of the presence of an anomaly.

Reward: The reward can be defined as per domain knowledge. Reward can be dependent on Radio Access Networks (RAN) KPI values and their thresholds. Some of the important RAN KPIs that we have considered identifying anomalies are CDR (call drop rate), CSSR (call set-up success rate), HSR (handover success rate), TCH (traffic channel congestion rate), call completion rate, speech quality index & signal strength. e.g., if the signal strength is below threshold i.e., signal strength is not falling between the required dBm range then reward will be positive as interference leads to poor signal strength.

Depending on the "action", the reward can be either positive or negative. Reward is positive if interference is observed and negative if there is no interference at that state. For example, it is known that anomaly will be prominent for cells to experience higher traffic. So, traffic could be a trigger to give more reward. To promote recommendation diversity, in addition to traffic, other factors that can be considered, include but are not limited to, path loss, time of the day, etc. The RL-agent (then tries to maximize the expected cumulative reward. In this learning setup, the self-supervised Q-learning loss is defined as a cross-entropy loss. The cross-entropy loss is used to rank the sequence of events to a binarized indicator of the occurrence or absence of the anomalous event. This cross-entropy loss measures the performance of a classification model where the output may be a probability value between 0 and 1. For example, an anomaly may be a 1, and a non-anomaly may be a 0. Then, via a neural network, probability values between 0 and 1 may now be generated to match the training data. If a value is 0.02 at a place where it is 1, it may give a high loss value. A perfect model may have the cross-entropy loss to be 0, that is, e.g., that the 1 may be predicted as 1. The self-supervised reinforcement learning module may then learn patterns in the data that may potentially give rise to local anomalies.

For the actor-critic variation, the self-supervised head is the "actor" and the Q-learning module is the "critic". The self-supervised learning network may be used to determine which factors to give more weightage to in the predictive model. Factors or features are combinations of variables that may give rise to an anomalous event, e.g., combinations of KPIs, such as interference, load, atmospheric conditions, etc.

Figure 10:
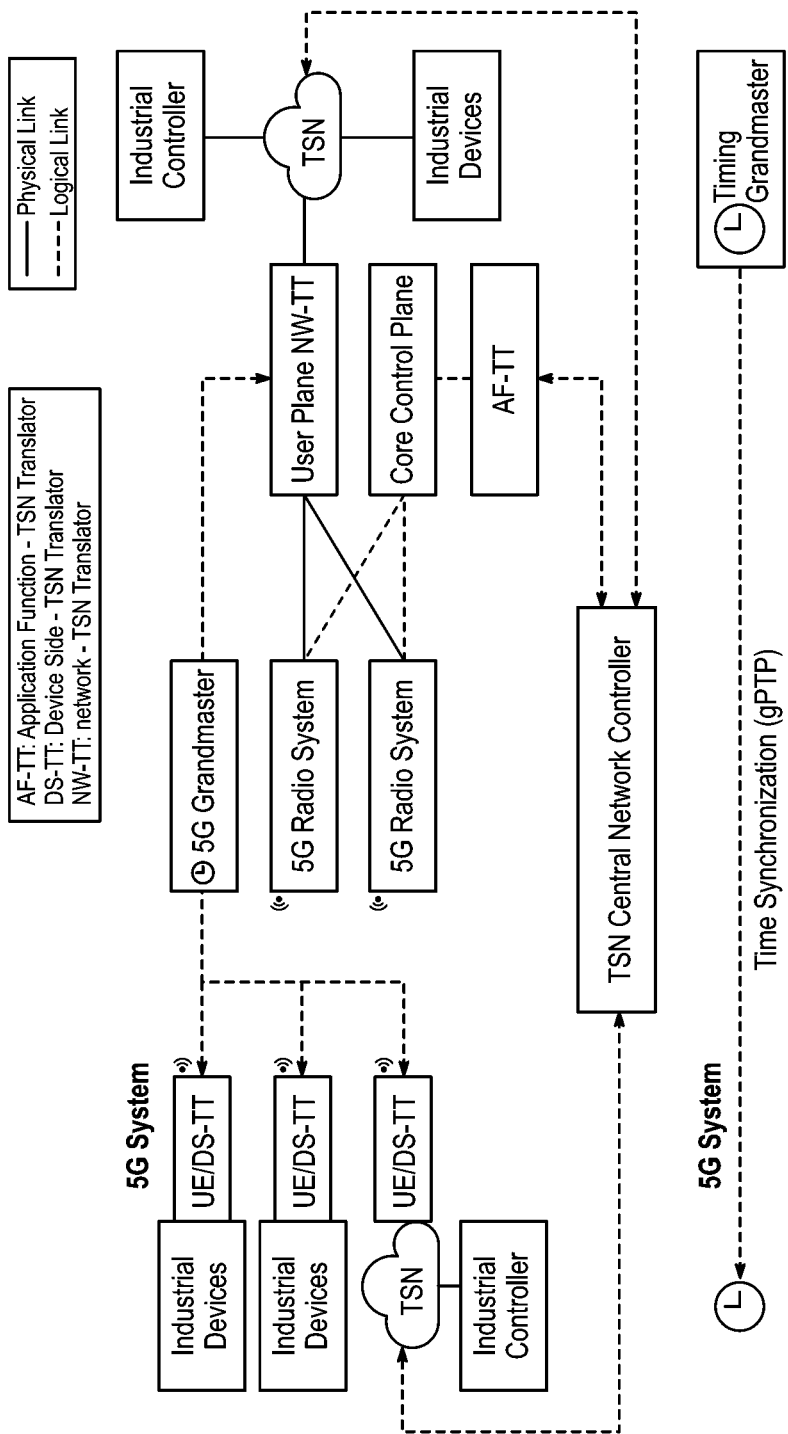
FIG. 10 illustrates a high-level IoT network topology.

FIG. 10 illustrates a high-level IoT network topology. Beyond the radio, IoT transactions disperse between control and user plane core nodes along the path from the IoT device to the server. Each IoT transaction involves multiple network control plane nodes, that manage IoT device to radio network coordination, and network user plane nodes, that manage IoT device to server data packet transportation. These core nodes are interdependent DDoS victims and detection points.

As described above, layers of anomaly classifications and causal inference preferably lead to targeted UE or network remedy actions. One challenge is to observe and act on data, from all the distributed core nodes, without creating an unmanageable amount of data collection, transportation, privacy, and compute overhead. Blockchain technology can also be implemented into systems and methods under the present disclosure and may help in alleviating at least some of these issues. Blockchain is a recent technology that records and maintains transactions in a verifiable and permanent manner using decentralized and open ledgers that can be updated from multiple nodes along a network transaction path.

A smart contract is a computer program that is executed in a secure environment that directly monitors and controls digital assets. A smart contract can be configured with rules that update records when specified conditions are met at nodes along a network transaction path.

Figure 11:
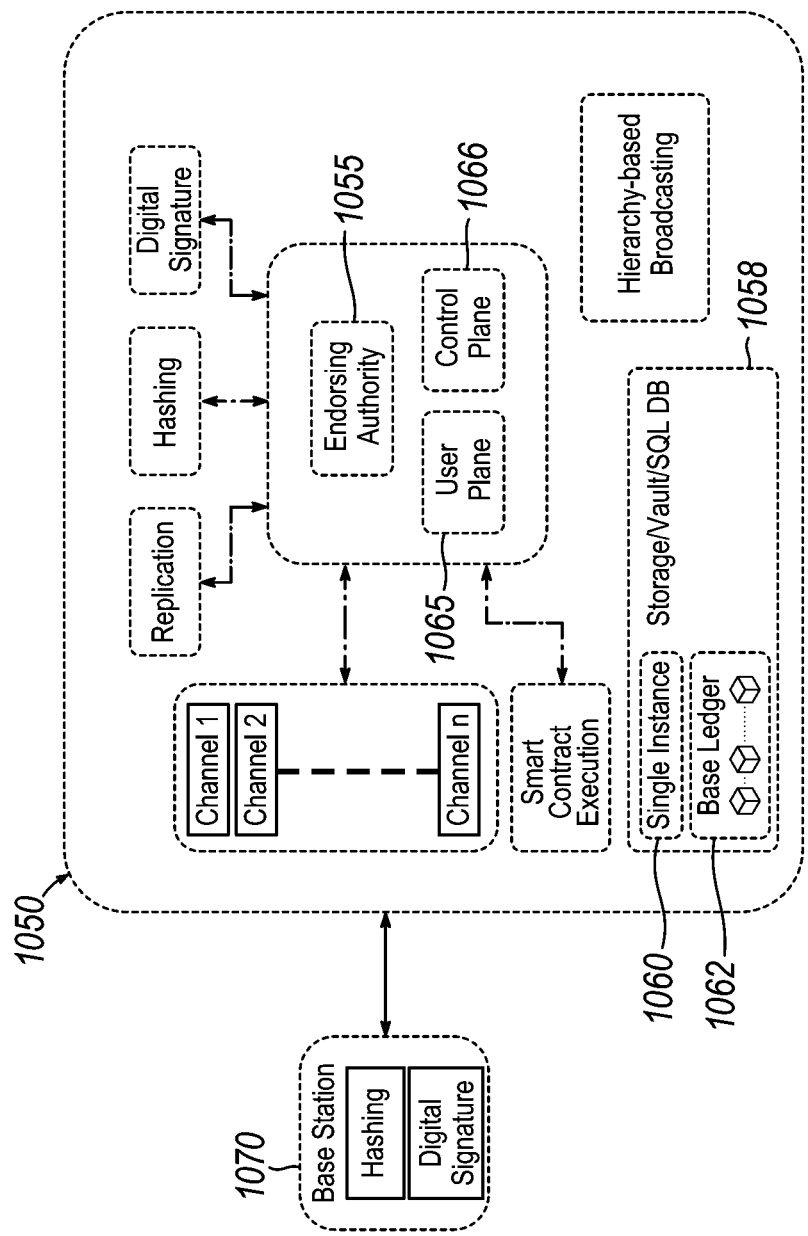
FIG. 11 illustrates a distributed ledger and smart contract embodiment under the present disclosure.

As shown in FIG. 11, when applied to the IoT DDoS use case, blockchain records and smart-contract-initiated updates can be used to track device behavior and network impacts, and therefore provide an efficient data source for DDoS anomaly detection, countermeasure and mitigation functions, from each intermediate node. Compared to traditional probing, packet inspection, and data caching techniques, this blockchain approach is better suited for the privacy, scale, and speed of IoT networks. Blockchains can also provide an incorruptible record of devices involved in a DDoS attack. The use of distributed ledgers, such as blockchains, can also allow for increased security and safe operation between equipment from different manufacturers. Whereas there are sometimes interoperability challenges between equipment from disparate manufacturers, if each device is operating on the same distributed ledger, then it will be easier to interoperate.

As shown in FIG. 11, base station 1070 and UE 1050 can comprise portions of a IoT system. UE 1050 could comprise any connected device, such as a mobile phone, sensor, smart device, or a base station or other node in a telecommunication, edge domain, or IoT system. Base station 1070 and UE 1050 can communicate over a plurality of channels 1, 2 . . . n. At least some types of communications and/or events can trigger a smart contract 1060. Storage 1058 can store a single instance of the blockchain base ledger 1062 (which may be replicated in other instances on other devices in the network, such as base station 1070). A smart contract 1060 can comprise part of the base ledger 1062. Endorsing authority 1055 can monitor incoming and outgoing packets and traffic on various planes or layers, such as the user plane 1065 and control plane 1066. Endorsing authority interfaces with and can execute the smart contract 1060. Endorsing authority 1055 can execute the replication, hashing, and digital signature functions used for participating in the blockchain. If a device(s) within the blockchain is identified as creating/participating in a DDoS attack, an identifier or location of such device(s) can be added to the base ledger 1062 of the blockchain located on UE 1050. This can create an incorruptible (or difficult to corrupt, depending on the specific blockchain used) record of devices to target for countermeasures.

Applied to control plane nodes, blockchain smart contracts can observe and alert anomalous UE detach, reconnect, paging, location update, and re-establish behaviors that indicate control plane DDoS attacks. Applied to user-plane nodes, blockchain smart contracts can observe and alert anomalous packet flow volume and activity patterns that indicate user plane IoT DDOS attacks. When combined from multiple nodes serving the same devices, blockchain smart contract reports can be observed for temporal and spatial patterns that can point to the presence, origin, and destination of DDoS attacks. Application of blockchain records and smart contract-induced updates to IoT DDoS use cases provides an effective distributed data source for DDoS anomaly detection, countermeasure, and mitigation functions. Blockchain-based solutions are better suited to IoT networks than classical probing, packet inspection, and data caching techniques because the raw data and rule computations are handled at the distributed nodes.

Applications of the blockchain under the present disclosure include at least the following:

Distributed nodes that are scattered. The transition from centralized cloud computing to decentralized Edge computing is well-suited to the decentralized Blockchain. Running Blockchain among distributed nodes has the potential to enable safe data sharing, tracking, and validation for large-scale IoT applications. As DDoS packets (user data or signaling data) traverse multiple distributed edge and internal nodes and interfaces, they can be observed and selectively identified by smart contracts at each distributed node. This is analogous to trapping fish at the incoming stream, versus angling the entire lake. When compared to centralized commercial clouds, the operational expenses of Blockchain and smart contracts could be greatly lowered.

Interaction between IoT devices and distributed nodes. Many problems with IoT devices can be solved using blockchain and smart contracts. If/when DDoS attacks are successful, they may create logjams (extra transaction volume and latency) at impacted nodes and interfaces. If these nodes and interfaces each have smart contracts with transaction volume and latency rules, then reports can be reported and/or received on when and where the logjams occur. Sensing DDoS anomalies at the source can be, therefore, more time and cost-efficient than mining anomalies from a central data lake.

Resistance to IoT cyberattacks. IoT devices typically lack the resources or capabilities to perform full-fledged security processes in the face of threats. Lightweight security approaches may be useful, but they are still in their infancy. Hackers will find it more difficult to disrupt the Blockchain without having enough CPU power to outrun the combined CPU power of the entire network and without being discovered with Blockchain and decentralized ledgers. Node-based Smart contracts also allow IoT devices to define agreements on specific actions, behaviors, and results, allowing hackers' anomalous conduct to be spotted, detected, and reported automatically. Furthermore, with the trusted Blockchain, it is feasible to set a "zero-trust" policy in the distributed network, which might monitor all network transactions and aid in the detection of strange behaviors, potential misuses, and assaults. Without being noticed and stopped, lateral moves from the hackers to the attacking targets will be far more difficult.

After DDoS or other threats have been identified, possibly with blockchain assistance as described above, countermeasures can be taken. Counter measures can comprise a variety of forms. At least some options are described above, such as the funneling of DDoS traffic to certain frequencies. Other, prior art countermeasures can be combined with blockchain embodiments as well. "Defense by offense," RRC connection reject, and other methods can be used, for example. FIG. 12 illustrates a RRC Connection Reject message according to 3GPP TS 36.331.

Figure 13:
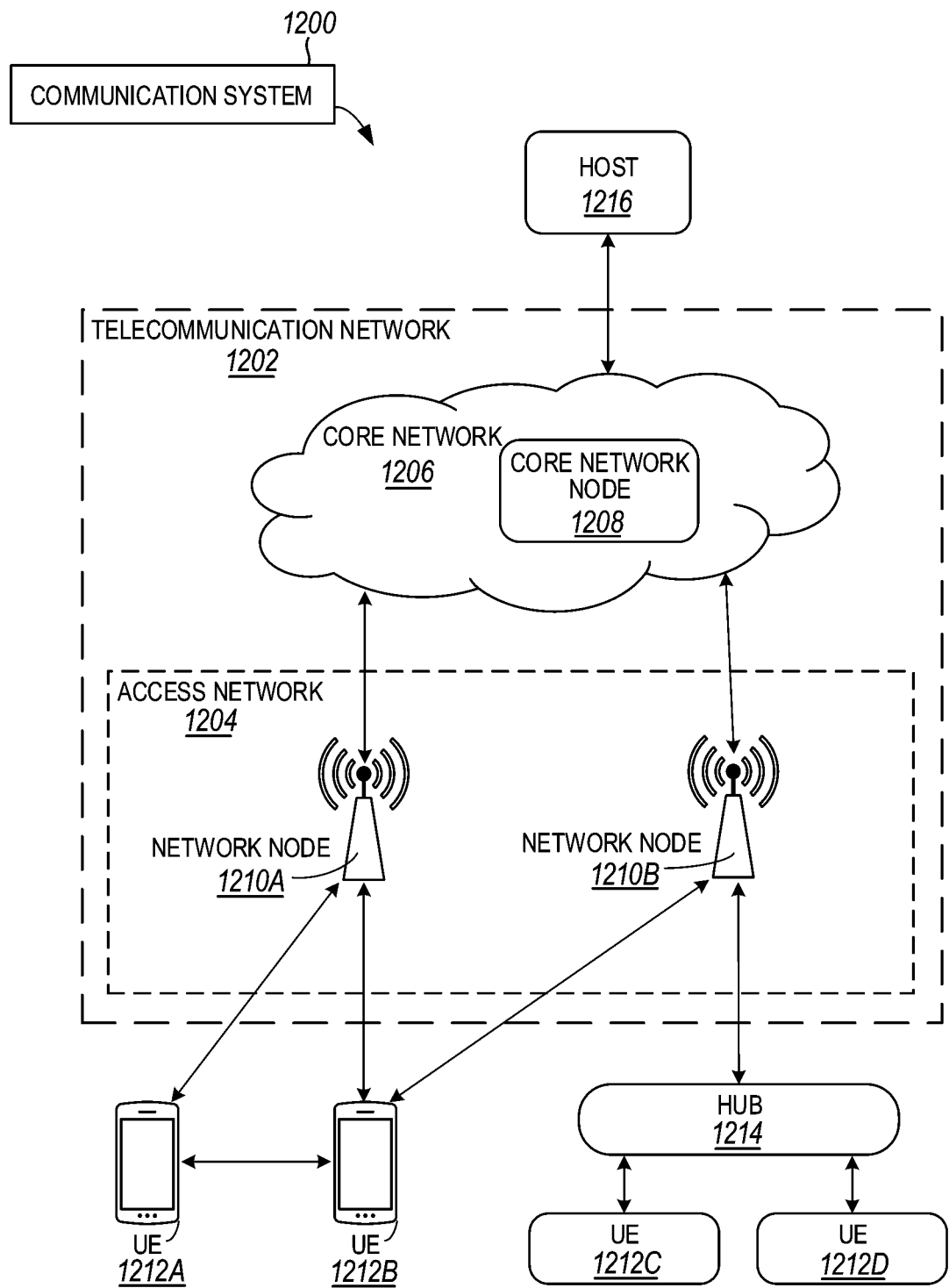
FIG. 13 illustrates a communication system embodiment under the present disclosure.

To illustrate the types of systems where aspects of the disclosed technology may be deployed, consider FIG. 13, which shows an example of a communication system 1200 in accordance with some embodiments.

In the example, the communication system 1200 includes a telecommunication network 1202 that includes an access network 1204, such as a radio access network (RAN), and a core network 1206, which includes one or more core network nodes 1208. The access network 1204 includes one or more access network nodes, such as network nodes 1210a and 1210b (one or more of which may be generally referred to as network nodes 1210), or any other similar 3rd Generation Partnership Project (3GPP) access node or non-3GPP access point. The network nodes 1210 facilitate direct or indirect connection of user equipment (UE), such as by connecting UEs 1212a, 1212b, 1212c, and 1212d (one or more of which may be generally referred to as UEs 1212) to the core network 1206 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1200 may include any number of wired or wireless networks, network nodes, UEs, and/or any other components or systems that may facilitate or participate in the communication of data and/or signals whether via wired or wireless connections. The communication system 1200 may include and/or interface with any type of communication, telecommunication, data, cellular, radio network, and/or other similar type of system.

The UEs 1212 may be any of a wide variety of communication devices, including wireless devices arranged, configured, and/or operable to communicate wirelessly with the network nodes 1210 and other communication devices. Similarly, the network nodes 1210 are arranged, capable, configured, and/or operable to communicate directly or indirectly with the UEs 1212 and/or with other network nodes or equipment in the telecommunication network 1202 to enable and/or provide network access, such as wireless network access, and/or to perform other functions, such as administration in the telecommunication network 1202.

In the depicted example, the core network 1206 connects the network nodes 1210 to one or more hosts, such as host 1216. These connections may be direct or indirect via one or more intermediary networks or devices. In other examples, network nodes may be directly coupled to hosts. The core network 1206 includes one more core network nodes (e.g., core network node 1208) that are structured with hardware and software components. Features of these components may be substantially similar to those described with respect to the UEs, network nodes, and/or hosts, such that the descriptions thereof are generally applicable to the corresponding components of the core network node 1208. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1216 may be under the ownership or control of a service provider other than an operator or provider of the access network 1204 and/or the telecommunication network 1202, and may be operated by the service provider or on behalf of the service provider. The host 1216 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1200 of FIG. 13 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1202 is a cellular network that implements 3GPP standardized features. Accordingly, the telecommunications network 1202 may support network slicing to provide different logical networks to different devices that are connected to the telecommunication network 1202. For example, the telecommunications network 1202 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1212 are configured to transmit and/or receive information without direct human interaction. For instance, a UE may be designed to transmit information to the access network 1204 on a predetermined schedule, when triggered by an internal or external event, or in response to requests from the access network 1204. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1214 communicates with the access network 1204 to facilitate indirect communication between one or more UEs (e.g., UE 1212*c* and/or 1212*d*) and network nodes (e.g., network node 1210*b*). In some examples, the hub 1214 may be a controller, router, content source and analytics, or any of the other communication devices described herein regarding UEs. For example, the hub 1214 may be a broadband router enabling access to the core network 1206 for the UEs. As another example, the hub 1214 may be a controller that sends commands or instructions to one or more actuators in the UEs. Commands or instructions may be received from the UEs, network nodes 1210, or by executable code, script, process, or other instructions in the hub 1214. As another example, the hub 1214 may be a data collector that acts as temporary storage for UE data and, in some embodiments, may perform analysis or other processing of the data. As another example, the hub 1214 may be a content source. For example, for a UE that is a VR headset, display, loudspeaker or other media delivery device, the hub 1214 may retrieve VR assets, video, audio, or other media or data related to sensory information via a network node, which the hub 1214 then provides to the UE either directly, after performing local processing, and/or after adding additional local content. In still another example, the hub 1214 acts as a proxy server or orchestrator for the UEs, in particular in if one or more of the UEs are low energy IoT devices.

The hub 1214 may have a constant/persistent or intermittent connection to the network node 1210*b*. The hub 1214 may also allow for a different communication scheme and/or schedule between the hub 1214 and UEs (e.g., UE 1212*c* and/or 1212*d*), and between the hub 1214 and the core network 1206. In other examples, the hub 1214 is connected to the core network 1206 and/or one or more UEs via a wired connection. Moreover, the hub 1214 may be configured to connect to an M2M service provider over the access network 1204 and/or to another UE over a direct connection. In some scenarios, UEs may establish a wireless connection with the network nodes 1210 while still connected via the hub 1214 via a wired or wireless connection. In some embodiments, the hub 1214 may be a dedicated hub—that is, a hub whose primary function is to route communications to/from the UEs from/to the network node 1210*b*. In other embodiments, the hub 1214 may be a non-dedicated hub—that is, a device which is capable of operating to route communications between the UEs and network node 1210*b*, but which is additionally capable of operating as a communication start and/or end point for certain data channels.

Figure 14:
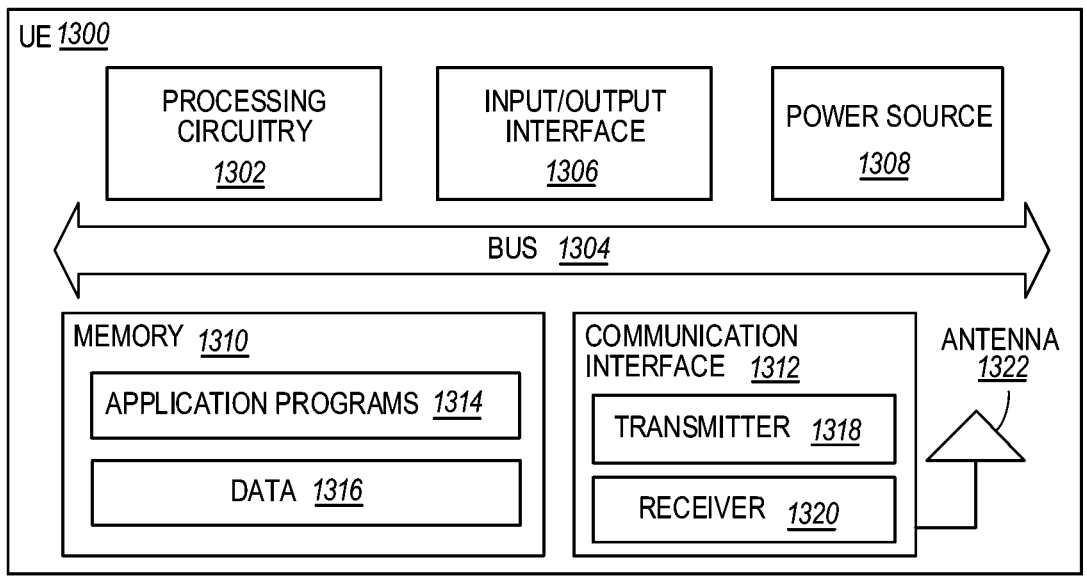
FIG. 14 illustrates a UE embodiment under the present disclosure.

FIG. 14 shows a UE 1300 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1300 includes processing circuitry 1302 that is operatively coupled via a bus 1304 to an input/output interface 1306, a power source 1308, a memory 1310, a communication interface 1312, and/or any other component, or any combination thereof. Certain UEs may utilize all or a subset of the components shown in FIG. 14. The level of integration between the components may vary from one UE to another UE. Further, certain UEs may contain multiple instances of a component, such as multiple processors, memories, transceivers, transmitters, receivers, etc.

The processing circuitry 1302 is configured to process instructions and data and may be configured to implement any sequential state machine operative to execute instructions stored as machine-readable computer programs in the memory 1310. The processing circuitry 1302 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1302 may include multiple central processing units (CPUs).

In the example, the input/output interface 1306 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1300. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1308 is structured as a battery or battery pack. Other types of power sources, such as an external power source (e.g., an electricity outlet), photovoltaic device, or power cell, may be used. The power source 1308 may further include power circuitry for delivering power from the power source 1308 itself, and/or an external power source, to the various parts of the UE 1300 via input circuitry or an interface such as an electrical power cable. Delivering power may be, for example, for charging of the power source 1308. Power circuitry may perform any formatting, converting, or other modification to the power from the power source 1308 to make the power suitable for the respective components of the UE 1300 to which power is supplied.

The memory 1310 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1310 includes one or more application programs 1314, such as an operating system, web browser application, a widget, gadget engine, or other application, and corresponding data 1316. The memory 1310 may store, for use by the UE 1300, any of a variety of various operating systems or combinations of operating systems.

The memory 1310 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1310 may allow the UE 1300 to access instructions, application programs and the like, stored on transitory or non-transitory memory media, to off-load data, or to upload data. An article of manufacture, such as one utilizing a communication system may be tangibly embodied as or in the memory 1310, which may be or comprise a device-readable storage medium.

The processing circuitry 1302 may be configured to communicate with an access network or other network using the communication interface 1312. The communication interface 1312 may comprise one or more communication subsystems and may include or be communicatively coupled to an antenna 1322. The communication interface 1312 may include one or more transceivers used to communicate, such as by communicating with one or more remote transceivers of another device capable of wireless communication (e.g., another UE or a network node in an access network). Each transceiver may include a transmitter 1318 and/or a receiver 1320 appropriate to provide network communications (e.g., optical, electrical, frequency allocations, and so forth). Moreover, the transmitter 1318 and receiver 1320 may be coupled to one or more antennas (e.g., antenna 1322) and may share circuit components, software or firmware, or alternatively be implemented separately.

In the illustrated embodiment, communication functions of the communication interface 1312 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1312, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1300 shown in FIG. 14.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 15:
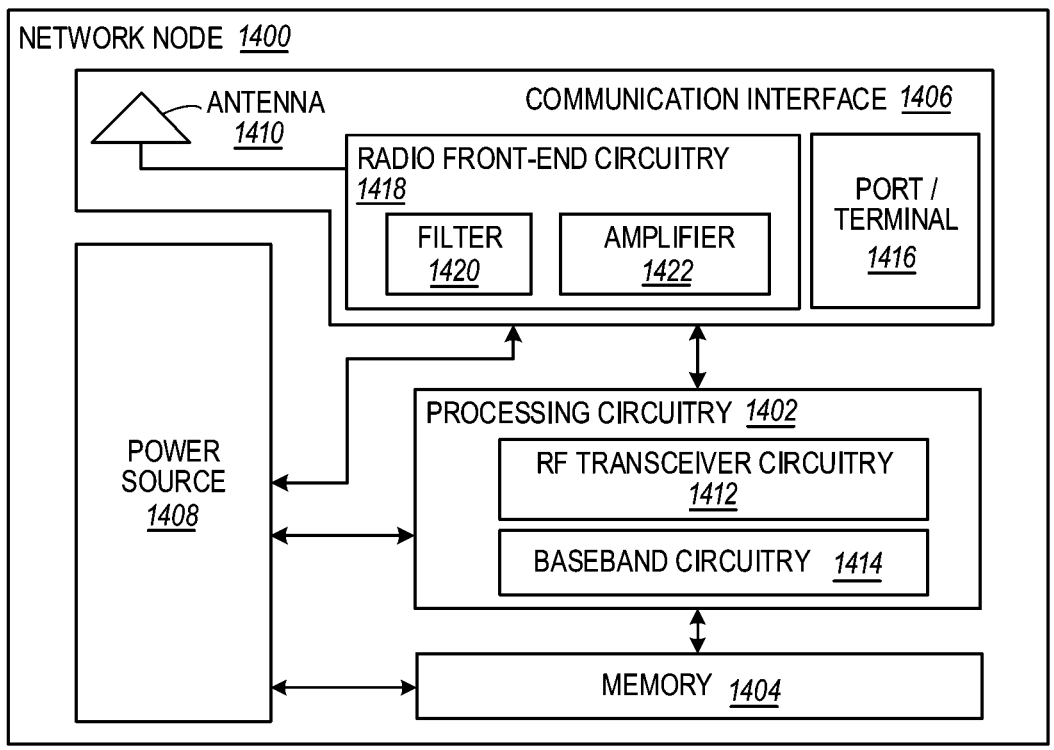
FIG. 15 illustrates network node embodiment under the present disclosure.

FIG. 15 shows a network node 1400 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1400 includes a processing circuitry 1402, a memory 1404, a communication interface 1406, and a power source 1408. The network node 1400 may be composed of multiple physically separate components (e.g., a NodeB component and a RNC component, or a BTS component and a BSC component, etc.), which may each have their own respective components. In certain scenarios in which the network node 1400 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1400 may be configured to support multiple radio access technologies (RATs). In such embodiments, some components may be duplicated (e.g., separate memory 1404 for different RATs) and some components may be reused (e.g., a same antenna 1410 may be shared by different RATs). The network node 1400 may also include multiple sets of the various illustrated components for different wireless technologies integrated into network node 1400, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1400.

The processing circuitry 1402 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1400 components, such as the memory 1404, to provide network node 1400 functionality.

In some embodiments, the processing circuitry 1402 includes a system on a chip (SOC). In some embodiments, the processing circuitry 1402 includes one or more of radio frequency (RF) transceiver circuitry 1412 and baseband processing circuitry 1414. In some embodiments, the radio frequency (RF) transceiver circuitry 1412 and the baseband processing circuitry 1414 may be on separate chips (or sets of chips), boards, or units, such as radio units and digital units. In alternative embodiments, part or all of RF transceiver circuitry 1412 and baseband processing circuitry 1414 may be on the same chip or set of chips, boards, or units.

The memory 1404 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1402. The memory 1404 may store any suitable instructions, data, or information, including a computer program, software, an application including one or more of logic, rules, code, tables, and/or other instructions capable of being executed by the processing circuitry 1402 and utilized by the network node 1400. The memory 1404 may be used to store any calculations made by the processing circuitry 1402 and/or any data received via the communication interface 1406. In some embodiments, the processing circuitry 1402 and memory 1404 is integrated.

The communication interface 1406 is used in wired or wireless communication of signaling and/or data between a network node, access network, and/or UE. As illustrated, the communication interface 1406 comprises port(s)/terminal(s) 1416 to send and receive data, for example to and from a network over a wired connection. The communication interface 1406 also includes radio front-end circuitry 1418 that may be coupled to, or in certain embodiments a part of, the antenna 1410. Radio front-end circuitry 1418 comprises filters 1420 and amplifiers 1422. The radio front-end circuitry 1418 may be connected to an antenna 1410 and processing circuitry 1402. The radio front-end circuitry may be configured to condition signals communicated between antenna 1410 and processing circuitry 1402. The radio front-end circuitry 1418 may receive digital data that is to be sent out to other network nodes or UEs via a wireless connection. The radio front-end circuitry 1418 may convert the digital data into a radio signal having the appropriate channel and bandwidth parameters using a combination of filters 1420 and/or amplifiers 1422. The radio signal may then be transmitted via the antenna 1410. Similarly, when receiving data, the antenna 1410 may collect radio signals which are then converted into digital data by the radio front-end circuitry 1418. The digital data may be passed to the processing circuitry 1402. In other embodiments, the communication interface may comprise different components and/or different combinations of components.

In certain alternative embodiments, the network node 1400 does not include separate radio front-end circuitry 1418, instead, the processing circuitry 1402 includes radio front-end circuitry and is connected to the antenna 1410. Similarly, in some embodiments, all or some of the RF transceiver circuitry 1412 is part of the communication interface 1406. In still other embodiments, the communication interface 1406 includes one or more ports or terminals 1416, the radio front-end circuitry 1418, and the RF transceiver circuitry 1412, as part of a radio unit (not shown), and the communication interface 1406 communicates with the baseband processing circuitry 1414, which is part of a digital unit (not shown).

The antenna 1410 may include one or more antennas, or antenna arrays, configured to send and/or receive wireless signals. The antenna 1410 may be coupled to the radio front-end circuitry 1418 and may be any type of antenna capable of transmitting and receiving data and/or signals wirelessly. In certain embodiments, the antenna 1410 is separate from the network node 1400 and connectable to the network node 1400 through an interface or port.

The antenna 1410, communication interface 1406, and/or the processing circuitry 1402 may be configured to perform any receiving operations and/or certain obtaining operations described herein as being performed by the network node. Any information, data and/or signals may be received from a UE, another network node and/or any other network equipment. Similarly, the antenna 1410, the communication interface 1406, and/or the processing circuitry 1402 may be configured to perform any transmitting operations described herein as being performed by the network node. Any information, data and/or signals may be transmitted to a UE, another network node and/or any other network equipment.

The power source 1408 provides power to the various components of network node 1400 in a form suitable for the respective components (e.g., at a voltage and current level needed for each respective component). The power source 1408 may further comprise, or be coupled to, power management circuitry to supply the components of the network node 1400 with power for performing the functionality described herein. For example, the network node 1400 may be connectable to an external power source (e.g., the power grid, an electricity outlet) via an input circuitry or interface such as an electrical cable, whereby the external power source supplies power to power circuitry of the power source 1408. As a further example, the power source 1408 may comprise a source of power in the form of a battery or battery pack which is connected to, or integrated in, power circuitry. The battery may provide backup power should the external power source fail.

Embodiments of the network node 1400 may include additional components beyond those shown in FIG. 15 for providing certain aspects of the network node's functionality, including any of the functionality described herein and/or any functionality necessary to support the subject matter described herein. For example, the network node 1400 may include user interface equipment to allow input of information into the network node 1400 and to allow output of information from the network node 1400. This may allow a user to perform diagnostic, maintenance, repair, and other administrative functions for the network node 1400.

Figure 16:
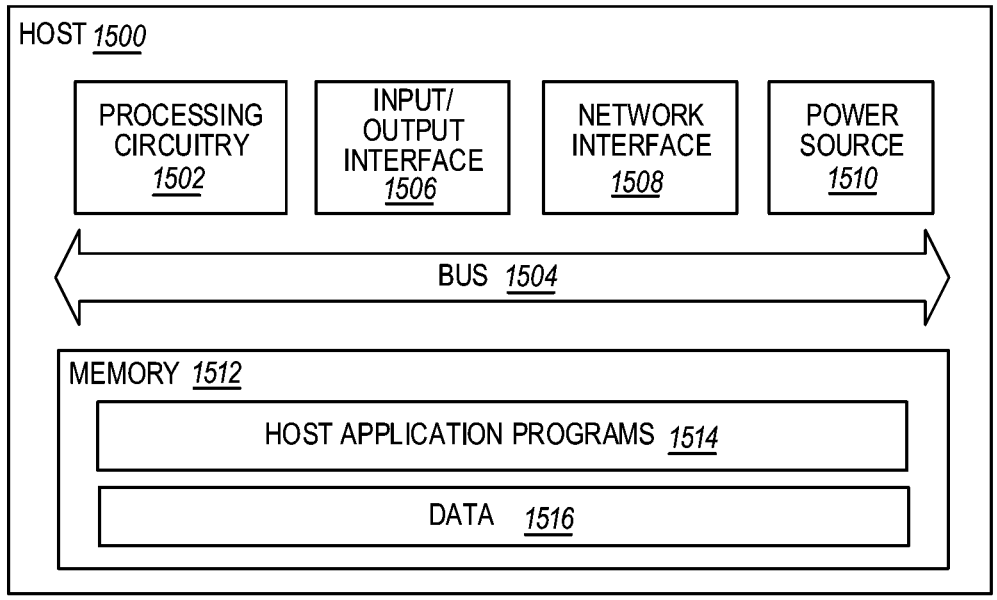
FIG. 16 illustrates a host embodiment under the present disclosure.

FIG. 16 is a block diagram of a host 1500, which may be an embodiment of the host 1216 of FIG. 13, in accordance with various aspects described herein. As used herein, the host 1500 may be or comprise various combinations hardware and/or software, including a standalone server, a blade server, a cloud-implemented server, a distributed server, a virtual machine, container, or processing resources in a server farm. The host 1500 may provide one or more services to one or more UEs.

The host 1500 includes processing circuitry 1502 that is operatively coupled via a bus 1504 to an input/output interface 1506, a network interface 1508, a power source 1510, and a memory 1512. Other components may be included in other embodiments. Features of these components may be substantially similar to those described with respect to the devices of previous figures, such as FIGS. 14 and 15, such that the descriptions thereof are generally applicable to the corresponding components of host 1500.

The memory 1512 may include one or more computer programs including one or more host application programs 1514 and data 1516, which may include user data, e.g., data generated by a UE for the host 1500 or data generated by the host 1500 for a UE. Embodiments of the host 1500 may utilize only a subset or all of the components shown. The host application programs 1514 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1514 may also provide for user authentication and licensing checks and may periodically report health, routes, and content availability to a central node, such as a device in or on the edge of a core network. Accordingly, the host 1500 may select and/or indicate a different host for over-the-top services for a UE. The host application programs 1514 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 17:
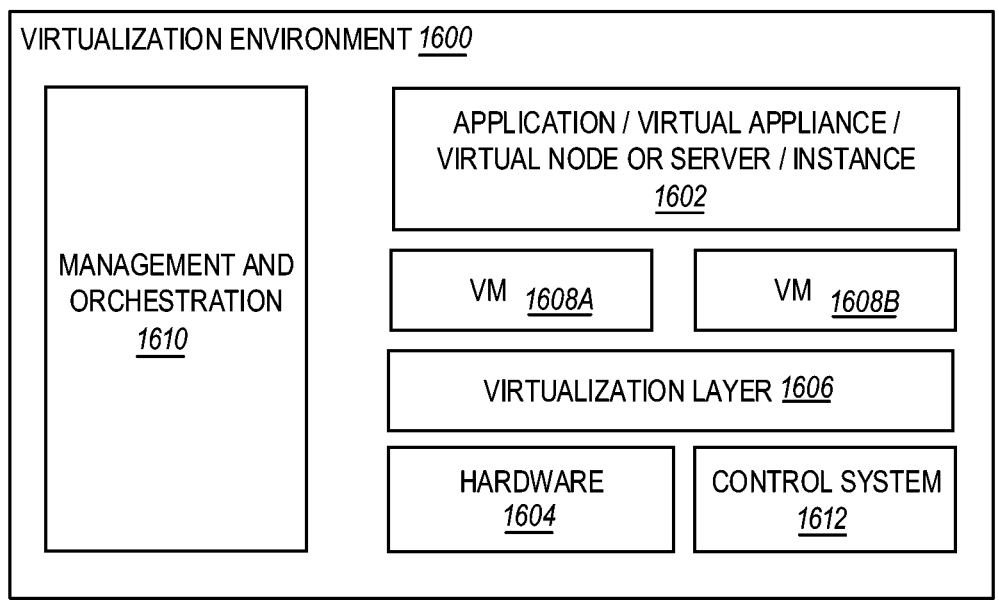
FIG. 17 illustrates a virtualization embodiment under the present disclosure.

FIG. 17 is a block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1600 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1602 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1604 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1606 (also referred to as hypervisors or virtual machine monitors (VMMs)), provide VMs 1608*a* and 1608*b* (one or more of which may be generally referred to as VMs 1208), and/or perform any of the functions, features and/or benefits described in relation with some embodiments described herein. The virtualization layer 1606 may present a virtual operating platform that appears like networking hardware to the VMs 1608.

The VMs 1608 comprise virtual processing, virtual memory, virtual networking or interface and virtual storage, and may be run by a corresponding virtualization layer 1606. Different embodiments of the instance of a virtual appliance 1602 may be implemented on one or more of VMs 1608, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1608 may be a software implementation of a physical machine that runs programs as if they were executing on a physical, non-virtualized machine. Each of the VMs 1608, and that part of hardware 1604 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1608 on top of the hardware 1604 and corresponds to the application 1602.

Hardware 1604 may be implemented in a standalone network node with generic or specific components. Hardware 1604 may implement some functions via virtualization. Alternatively, hardware 1604 may be part of a larger cluster of hardware (e.g. such as in a data center or CPE) where many hardware nodes work together and are managed via management and orchestration 1610, which, among others, oversees lifecycle management of applications 1602. In some embodiments, hardware 1604 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1612 which may alternatively be used for communication between hardware nodes and radio units.

Figure 18:
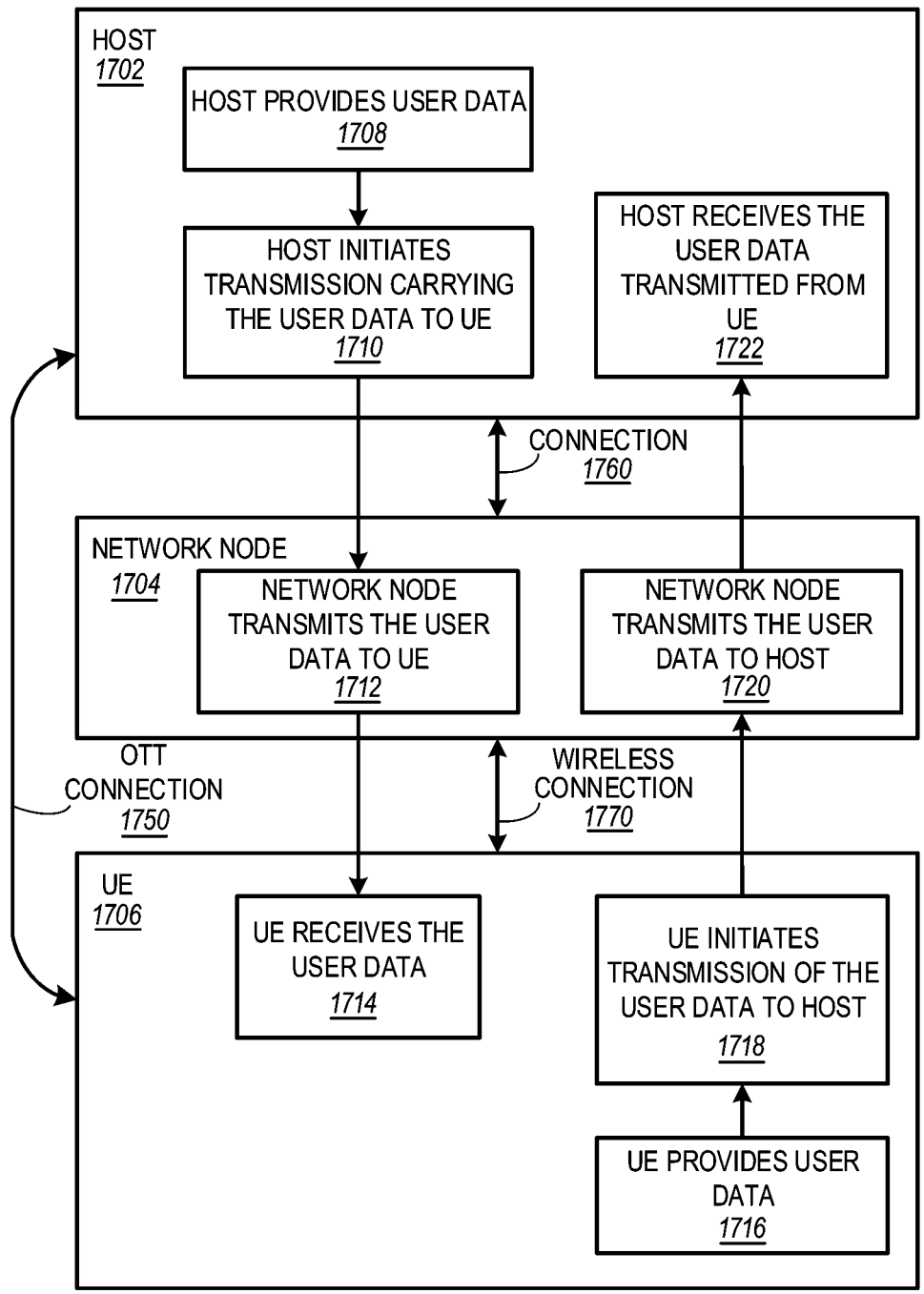
FIG. 18 illustrates a communication process flow embodiment under the present disclosure.

FIG. 18 shows a communication diagram of a host 1702 communicating via a network node 1704 with a UE 1706 over a partially wireless connection in accordance with some embodiments. Example implementations, in accordance with various embodiments, of the UE (such as a UE 1212*a* of FIG. 13 and/or UE 1300 of FIG. 14), network node (such as network node 1210*a* of FIG. 13 and/or network node 1400 of FIG. 15), and host (such as host 1216 of FIG. 13 and/or host 1500 of FIG. 16) discussed in the preceding paragraphs will now be described with reference to FIG. 18.

Like host 1500, embodiments of host 1702 include hardware, such as a communication interface, processing circuitry, and memory. The host 1702 also includes software, which is stored in or accessible by the host 1702 and executable by the processing circuitry. The software includes a host application that may be operable to provide a service to a remote user, such as the UE 1706 connecting via an over-the-top (OTT) connection 1750 extending between the UE 1706 and host 1702. In providing the service to the remote user, a host application may provide user data which is transmitted using the OTT connection 1750.

The network node 1704 includes hardware enabling it to communicate with the host 1702 and UE 1706. The connection 1760 may be direct or pass through a core network (like core network 1206 of FIG. 13) and/or one or more other intermediate networks, such as one or more public, private, or hosted networks. For example, an intermediate network may be a backbone network or the Internet.

The UE 1706 includes hardware and software, which is stored in or accessible by UE 1706 and executable by the UE's processing circuitry. The software includes a client application, such as a web browser or operator-specific "app" that may be operable to provide a service to a human or non-human user via UE 1706 with the support of the host 1702. In the host 1702, an executing host application may communicate with the executing client application via the OTT connection 1750 terminating at the UE 1706 and host 1702. In providing the service to the user, the UE's client application may receive request data from the host's host application and provide user data in response to the request data. The OTT connection 1750 may transfer both the request data and the user data. The UE's client application may interact with the user to generate the user data that it provides to the host application through the OTT connection 1750.

The OTT connection 1750 may extend via a connection 1760 between the host 1702 and the network node 1704 and via a wireless connection 1770 between the network node 1704 and the UE 1706 to provide the connection between the host 1702 and the UE 1706. The connection 1760 and wireless connection 1770, over which the OTT connection 1750 may be provided, have been drawn abstractly to illustrate the communication between the host 1702 and the UE 1706 via the network node 1704, without explicit reference to any intermediary devices and the precise routing of messages via these devices.

As an example of transmitting data via the OTT connection 1750, in step 1708, the host 1702 provides user data, which may be performed by executing a host application. In some embodiments, the user data is associated with a particular human user interacting with the UE 1706. In other embodiments, the user data is associated with a UE 1706 that shares data with the host 1702 without explicit human interaction. In step 1710, the host 1702 initiates a transmission carrying the user data towards the UE 1706. The host 1702 may initiate the transmission responsive to a request transmitted by the UE 1706. The request may be caused by human interaction with the UE 1706 or by operation of the client application executing on the UE 1706. The transmission may pass via the network node 1704, in accordance with the teachings of the embodiments described throughout this disclosure. Accordingly, in step 1712, the network node 1704 transmits to the UE 1706 the user data that was carried in the transmission that the host 1702 initiated, in accordance with the teachings of the embodiments described throughout this disclosure. In step 1714, the UE 1706 receives the user data carried in the transmission, which may be performed by a client application executed on the UE 1706 associated with the host application executed by the host 1702.

In some examples, the UE 1706 executes a client application which provides user data to the host 1702. The user data may be provided in reaction or response to the data received from the host 1702. Accordingly, in step 1716, the UE 1706 may provide user data, which may be performed by executing the client application. In providing the user data, the client application may further consider user input received from the user via an input/output interface of the UE 1706. Regardless of the specific manner in which the user data was provided, the UE 1706 initiates, in step 1718, transmission of the user data towards the host 1702 via the network node 1704. In step 1720, in accordance with the teachings of the embodiments described throughout this disclosure, the network node 1704 receives user data from the UE 1706 and initiates transmission of the received user data towards the host 1702. In step 1722, the host 1702 receives the user data carried in the transmission initiated by the UE 1706.

In an example scenario, factory status information may be collected and analyzed by the host 1702. As another example, the host 1702 may process audio and video data which may have been retrieved from a UE for use in creating maps. As another example, the host 1702 may collect and analyze real-time data to assist in controlling vehicle congestion (e.g., controlling traffic lights). As another example, the host 1702 may store surveillance video uploaded by a UE. As another example, the host 1702 may store or control access to media content such as video, audio, VR or AR which it can broadcast, multicast or unicast to UEs. As other examples, the host 1702 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1750 between the host 1702 and UE 1706, in response to variations in the measurement results. The measurement procedure and/or the network functionality for reconfiguring the OTT connection may be implemented in software and hardware of the host 1702 and/or UE 1706. In some embodiments, sensors (not shown) may be deployed in or in association with other devices through which the OTT connection 1750 passes; the sensors may participate in the measurement procedure by supplying values of the monitored quantities exemplified above, or supplying values of other physical quantities from which software may compute or estimate the monitored quantities. The reconfiguring of the OTT connection 1750 may include message format, retransmission settings, preferred routing etc.; the reconfiguring need not directly alter the operation of the network node 1704. Such procedures and functionalities may be known and practiced in the art. In certain embodiments, measurements may involve proprietary UE signaling that facilitates measurements of throughput, propagation times, latency and the like, by the host 1702. The measurements may be implemented in that software causes messages to be transmitted, in particular empty or 'dummy' messages, using the OTT connection 1750 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

In the above-description of various embodiments of the present disclosure, it is to be understood that the terminology used herein is for the purpose of describing particular embodiments only and is not intended to be limiting on the scope of protection provided by this or any related document. Unless otherwise defined, all terms (including technical and scientific terms) used herein have the same meaning as commonly understood by one of ordinary skill in the art to which this invention belongs as shown by a general purpose dictionary.

At least some example embodiments are described herein with reference to block diagrams and/or flowchart illustrations of computer-implemented methods, apparatus (systems and/or devices) and/or computer software. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

Further illustrations of potential implementations and variations are provided by the examples below, which relate to various non-exhaustive ways in which the teachings herein may be combined or applied. It should be understood that the following examples are not intended to restrict the coverage of any claims that may be presented at any time in this document or in subsequent filings based on this document. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this document or any related document that include additional features beyond those referred to below, those additional features shall not be presumed to have been added for any reason relating to patentability Example 1

Figure 19:
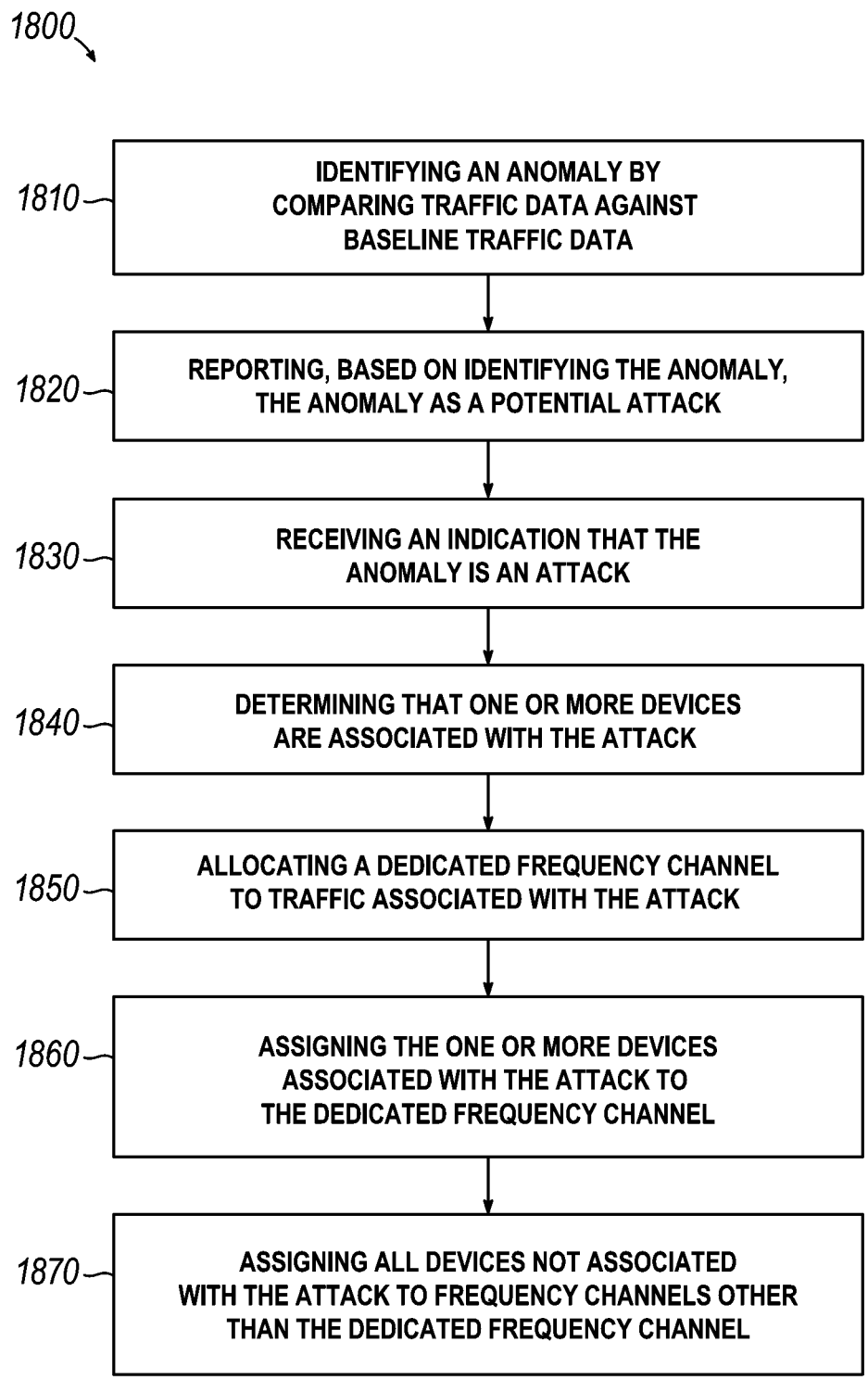
FIG. 19 illustrates a method embodiment under the present disclosure.

One example embodiment comprises a method 1800 for responding to a denial of service attack. Method 1800 can be seen illustrated in FIG. 19. Step 1810 is identifying an anomaly by comparing traffic data against baseline traffic data. Step 1820 is reporting, based on identifying the anomaly, the anomaly as a potential attack. Step 1830 is receiving an indication that the anomaly is an attack. Step 1840 is determining that one or more devices are associated with the attack. Step 1850 is allocating a dedicated frequency channel to traffic associated with the attack. Step 1860 is assigning the one or more devices associated with the attack to the dedicated frequency channel. Step 1870 is assigning all devices not associated with the attack to frequency channels other than the dedicated frequency channel.

Method 1800 can comprise a number of variations and additional elements and steps. For example, the steps of identifying, reporting, receiving, determining, allocating, and/or assigning, can be performed by an element of a 5G or other network, such as a network node, base station, AMF or other component. Method 1800 can further include updating a record with an identifier for each device from the one or more devices associated with the attack; and reporting the updated record to a base station associated with a plurality of network nodes. In some embodiments this updating can comprise a blockchain or smart contract transaction. In some embodiments of method 1800 the reporting can comprise reporting the anomaly to a base station, and wherein the indication is sent by the base station and is based on traffic data from a network node; and traffic data from one or more other network nodes, wherein each of the other network nodes is a neighboring node of the network node. In this way, traffic and signals to/from neighboring nodes can be compared to see if the traffic is anomalous and may indicate a DDoS attack. For example, the analyzed traffic data can comprise at least one of: uplink noise pattern detection; time-series comparisons; time-series distance based methods; sequence modeling based methods; and more. In further possible embodiments, method 1800 can comprise a base station localizing a device associated with the attack based on timing advance values from three separate network nodes for the device associated with the attack. In these types of embodiments, the timing advance values from three separate network nodes for the device associated with the attack can comprise timing advance values collected at different times as the device associated with the attack moves between network nodes. Alternatively, the timing advance values from three separate network nodes for the device associated with the attack can be timing advance values collected after the base station forces the device associated with the attack to switch between network nodes irrespective of movement.

Example 2

Figure 20:
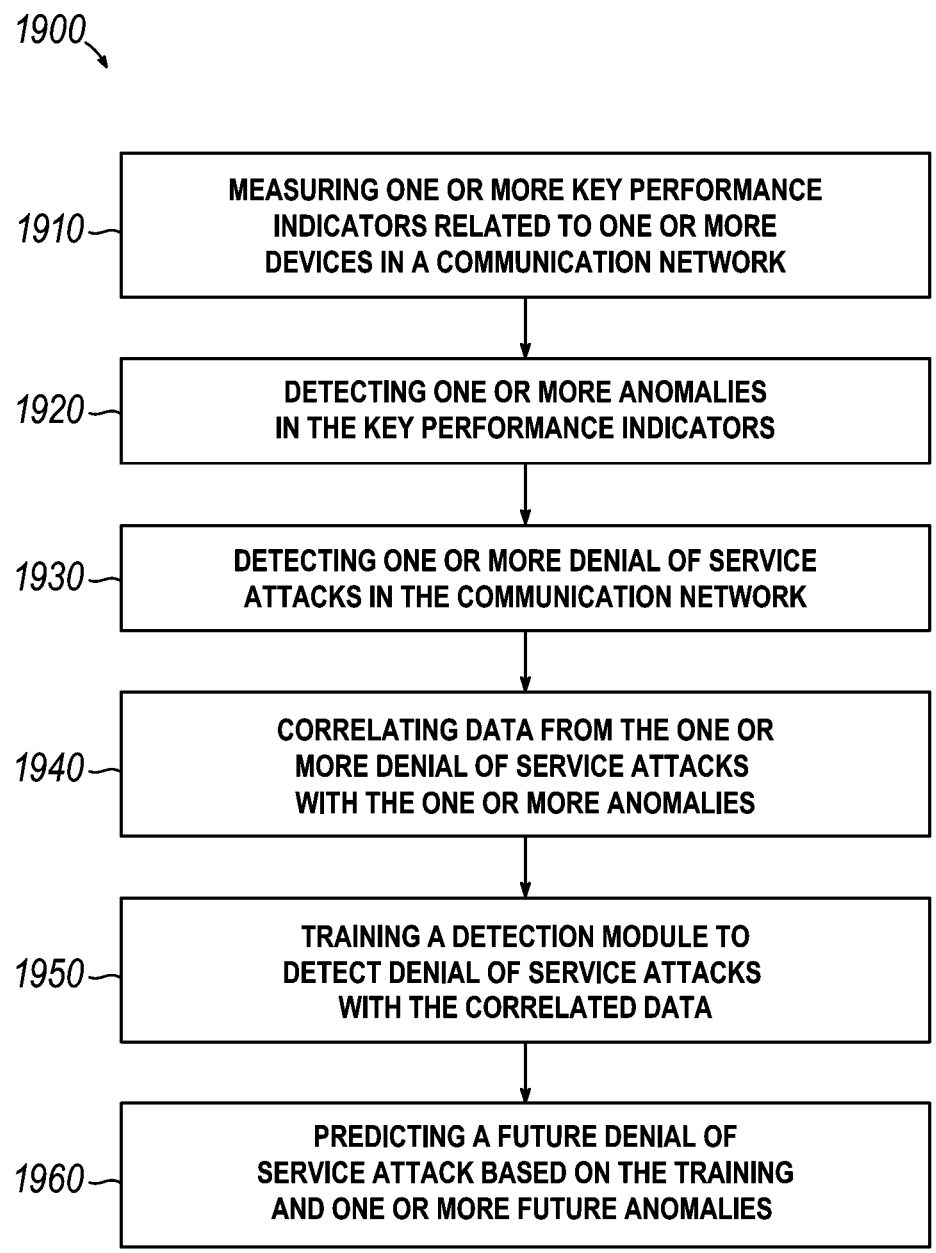
FIG. 20 illustrates a method embodiment under the present disclosure.

Another example embodiment comprises a method 1900 for detecting denial of service attacks. Method 1900 can be seen illustrated in FIG. 20. Step 1910 is measuring one or more key performance indicators related to one or more devices in a communication network. Step 1920 is detecting one or more anomalies in the key performance indicators. Step 1930 is detecting one or more denial of service attacks in the communication network. Step 1940 is correlating data from the one or more denial of service attacks with the one or more anomalies. Step 1950 is training a detection module to detect denial of service attacks with the correlated data. Step 1960 is predicting a future denial of service attack based on the training and one or more future anomalies. After detecting a denial of service attack, method 1900 can incorporate methods 1800 and/or 2000 as steps for responding to the attack.

Method 1900 can comprise a number of variations and additional elements and steps. For example, method 1900 can further comprise initiating one or more countermeasures in response to the predicting. Another embodiment can comprise identifying one or more devices associated with the denial of service attack based on the one or more future anomalies. A further embodiment can further comprise recording the one or more devices associated with the attack on a blockchain comprising the one or more devices. Another additional embodiment can further comprise allocating a dedicated frequency channel to traffic associated with the attack; assigning the one or more devices associated with the attack to the dedicated frequency channel; and assigning all devices not associated with the attack to frequency channels other than the dedicated frequency channel. In further possible embodiments, the training can comprise at least one of: machine learning, reinforcement learning, actor critic learning, supervised learning, unsupervised learning.

Example 3

Figure 21:
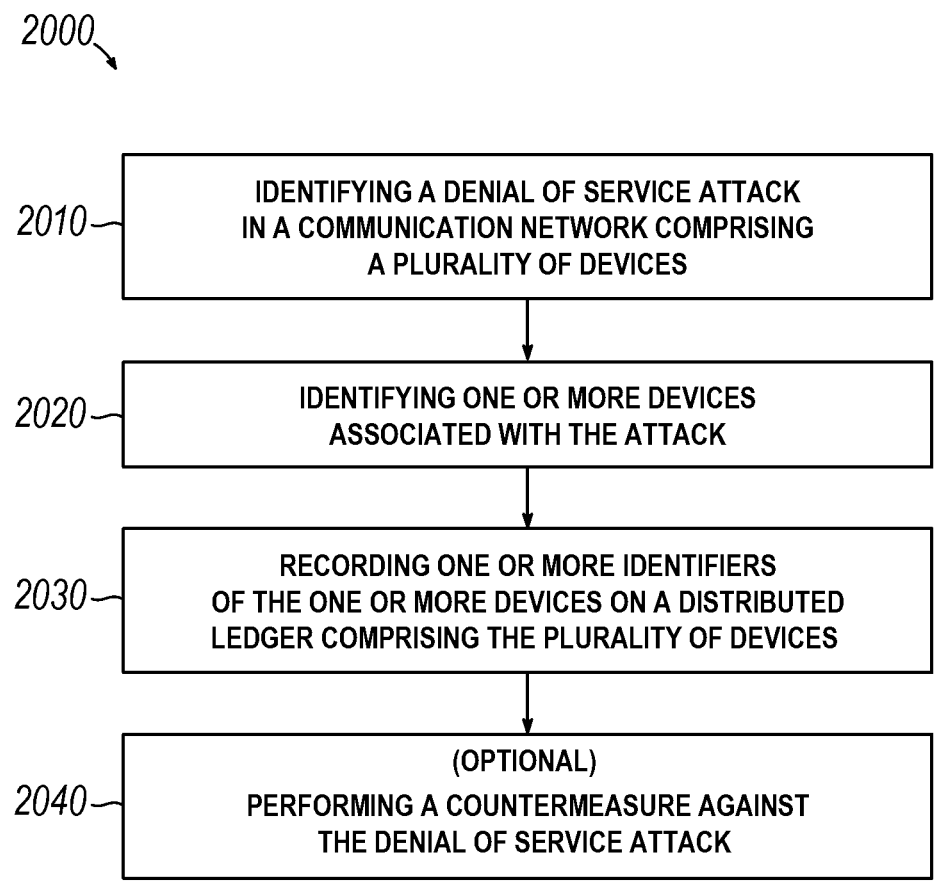
FIG. 21 illustrates a method embodiment under the present disclosure.

A further example embodiment comprises a method 2000 for responding to a denial of service attack. Method 2000 can be seen illustrated in FIG. 21. Step 2010 is identifying a denial of service attack in a communication network comprising a plurality of devices. Step 2020 is identifying one or more devices associated with the attack. Step 2030 is recording one or more identifiers of the one or more devices on a distributed ledger comprising the plurality of devices. Step 2040 (optional) is performing a countermeasure against the denial of service attack. Steps 2010 and 2020 can comprise steps of method 1800 for identifying an attack or devices. Step 2040 can comprise, e.g., steps 1850-1870 of method 1800.

Method 2000 can comprise a number of variations and additional elements and steps. For example, the one or more identifiers comprise at least one of: device name; device location; IMEI (International Mobile Equipment Identity) number; MSISDN (Mobile Station International Sub scriber Directory number); IMSI (International Mobile Sub scriber Identity); and SIM (Subscriber Identity Module) number. In another possible variation, the identifying a denial of service attack comprises: measuring one or more key performance indicators related to the plurality of devices in a communication network; detecting one or more anomalies in the key performance indicators; detecting one or more denial of service attacks in the communication network; correlating data from the one or more denial of service attacks with the one or more anomalies; training a detection module to detect denial of service attacks with the correlated data; and predicting a future denial of service attack based on the training and one or more future anomalies. In other embodiments the performing a countermeasure comprises identifying an anomaly by comparing traffic data against baseline traffic data; reporting, based on identifying the anomaly, the anomaly as a potential attack; receiving an indication that the anomaly is an attack; determining that the one or more devices are associated with the attack; allocating a dedicated frequency channel to traffic associated with the attack; assigning the one or more devices associated with the attack to the dedicated frequency channel; and assigning all devices not associated with the attack to frequency channels other than the dedicated frequency channel. In other variations, the distributed leger comprises a blockchain, comprises one or more smart contracts, or enables interoperability between devices from different manufacturers.

Additional Examples

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks (such as e.g., method embodiments 1800, 1900, and 2000). Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof. Examples of possible hardware and/or software embodiments are shown in at least, e.g., FIGS. 13-16, which illustrate possible UE, network node, host, and virtualization environment embodiments and their comprising hardware and/or software.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated and blocks from different flowcharts may be combined, rearranged, and/or reconfigured into additional flowcharts in any combination or subcombination. Moreover, although some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, module, element, step, act, or function is essential such that it must be included in the scope of the claims. Reference to an element in the singular is not intended to mean "one and only one" unless explicitly so stated, but rather "one or more" or "at least one". Similarly, any statement that a first item is "based on" one or more other items should be understood to mean that the first item is determined at least in part by the other items it is identified as being "based on." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for responding to denial of service attacks, the method comprising:
   identifying an anomaly by comparing one or more traffic data against one or more baseline traffic data;
   reporting, based on the identifying the anomaly, the anomaly as a potential attack;
   receiving an indication that the anomaly is an attack;
   determining that one or more devices are associated with the attack;
   allocating a dedicated frequency channel to traffic associated with the attack;
   assigning the one or more devices associated with the attack to the dedicated frequency channel;
   assigning all devices not associated with the attack to frequency channels other than the dedicated frequency channel; and
   localizing, at least one of the one or more devices associated with the attack based at least in part on timing advance values and/or angle of arrival data from one or more network nodes for the at least one of the one or more devices.

2. The method of claim 1 wherein a network node performs at least one of: the identifying, the reporting, the receiving, the determining, the allocating, and the assigning.

3. The method of claim 1, further comprising:
   updating a record with an identifier for each device from the one or more devices associated with the attack; and
   reporting the updated record to a base station associated with a plurality of network nodes.

4. The method of claim 1, wherein the reporting comprises reporting the anomaly to a base station, and wherein the indication is sent by the base station and is based at least in part on the one or more traffic data, wherein the one or more traffic data comprises first traffic data received from a network node and second traffic data received from one or more other network nodes, wherein each of the other network nodes is a neighboring node of the network node.

5. The method of claim 4, wherein the timing advance values are from three separate network nodes for the at least one device associated with the attack.

6. The method of claim 5, wherein the timing advance values from three separate network nodes for the device associated with the attack are timing advance values collected at different times as the device associated with the attack moves between network nodes, and wherein the timing advance values are collected after the base station forces the device associated with the attack to switch between network nodes irrespective of the movement between network nodes.

7. The method of claim 4, wherein the one or more traffic data is indicative of a DDOS attack and the method further comprises at least one of: uplink noise pattern detection; time-series comparisons; time-series distance based methods; sequence modeling based methods.

8. A method for responding to denial of service attacks, the method comprising:
   identifying an anomaly by comparing one or more traffic data against one or more baseline traffic data;
   reporting, to a base station, based on the identifying the anomaly, the anomaly as a potential attack;
   receiving, from the base station, an indication that the anomaly is an attack, wherein the indication is based at least in part on the one or more traffic data, wherein the one or more traffic data comprises first traffic data received from a network node and second traffic data received from one or more other network nodes, wherein each of the one or more other network nodes is a neighboring node of the network node;

determining that one or more devices are associated with the attack;

allocating a dedicated frequency channel to traffic associated with the attack;

assigning the one or more devices associated with the attack to the dedicated frequency channel;

assigning all devices not associated with the attack to frequency channels other than the dedicated frequency channel; and localizing, by the base station, the one or more devices associated with the attack based on timing advance values from one or more network nodes for the one or more devices associated with the attack.

9. The method of claim 8 wherein a network node performs at least one of: the identifying, the reporting, the receiving, the determining, the allocating, and the assigning.

10. The method of claim 8, further comprising:
updating a record with an identifier for each device from the one or more devices associated with the attack; and
reporting the updated record to a second base station associated with the one or more network nodes.

11. The method of claim 8, wherein the timing advance values from one or more network nodes for the device associated with the attack are timing advance values collected at different times as the device associated with the attack moves between network nodes, and wherein the timing advance values are collected after the base station forces the device associated with the attack to switch between network nodes irrespective of the movement between network nodes.

12. The method of claim 8, wherein the one or more traffic data is indicative of a distributed denial of service attack and the method further comprises at least one of:
performing uplink noise pattern detection;
performing time-series comparisons;
performing time-series distance-based methods;
performing sequence modeling-based methods.

13. A method for responding to denial of service attacks, the method comprising:
identifying, in an internet of things (IoT) network, an anomaly by comparing one or more traffic data against one or more baseline traffic data, wherein the one or more traffic data comprises first traffic data received from one or more network nodes and second traffic data received from one or more other network nodes, wherein each of the one or more other network nodes is a neighboring node of the one or more network nodes;

reporting, to a network node, based on the identifying the anomaly, the anomaly as a potential attack;

receiving, from the network node, an indication that the anomaly is an attack, wherein the indication is based at least in part on the one or more traffic data;

determining that one or more devices are associated with the attack;

allocating a dedicated frequency channel to traffic associated with the attack;

assigning the one or more devices associated with the attack to the dedicated frequency channel;

assigning all devices not associated with the attack to frequency channels other than the dedicated frequency channel; and localizing, by the one or more network nodes or the one or more other network nodes, the one or more devices associated with the attack based on timing advance values from the one or more network nodes or the one or more other network nodes for the one or more devices associated with the attack.

14. The method of claim 13 wherein a network node performs at least one of: the identifying, the reporting, the receiving, the determining, the allocating, and the assigning.

15. The method of claim 13, further comprising:
updating a record with an identifier for each device from the one or more devices associated with the attack; and
reporting the updated record to a base station associated with a plurality of network nodes.

16. The method of claim 13, wherein the timing advance values are collected at different times as the device associated with the attack moves between network nodes, and wherein the timing advance values are collected after a network node forces the device associated with the attack to switch between network nodes irrespective of the movement between network nodes.

17. The method of claim 13, wherein the one or more traffic data is indicative of a distributed denial of service attack and the method further comprises at least one of:
performing uplink noise pattern detection;
performing time-series comparisons;
performing time-series distance-based methods;
performing sequence modeling-based methods.

* * * * *